United States Patent
Nakamura et al.

(10) Patent No.: US 8,213,682 B2
(45) Date of Patent: Jul. 3, 2012

(54) FEATURE INFORMATION COLLECTING APPARATUSES, METHODS, AND PROGRAMS

(75) Inventors: Masaki Nakamura, Okazaki (JP); Koichi Nakao, Okazaki (JP); Motoki Kanba, Okazaki (JP)

(73) Assignee: Aisin AW Co., Ltd., Amjo (JP)

( * ) Notice: Subject to any disclaimer, the term of this patent is extended or adjusted under 35 U.S.C. 154(b) by 1149 days.

(21) Appl. No.: 12/073,867

(22) Filed: Mar. 11, 2008

(65) Prior Publication Data

US 2008/0240505 A1  Oct. 2, 2008

(30) Foreign Application Priority Data

Mar. 30, 2007 (JP) ................................. 2007-091046

(51) Int. Cl.
*G06K 9/00* (2006.01)
(52) U.S. Cl. .................. 382/104; 382/100; 382/103
(58) Field of Classification Search .................. 382/100, 382/103, 104
See application file for complete search history.

(56) References Cited

U.S. PATENT DOCUMENTS

| | | | | |
|---|---|---|---|---|
| 5,521,579 A * | 5/1996 | Bernhard | ...................... | 340/438 |
| 6,047,234 A * | 4/2000 | Cherveny et al. | ............. | 701/200 |
| 6,226,592 B1 * | 5/2001 | Luckscheiter et al. | ........ | 701/301 |
| 6,292,111 B1 * | 9/2001 | Ishikawa et al. | ............... | 340/937 |
| 6,381,533 B1 * | 4/2002 | Crane et al. | .................... | 701/200 |
| 6,560,529 B1 * | 5/2003 | Janssen | .......................... | 701/200 |
| 6,737,963 B2 * | 5/2004 | Gutta et al. | .................... | 340/435 |
| 7,603,215 B2 * | 10/2009 | Matsumoto et al. | ............ | 701/41 |
| 2004/0143381 A1 * | 7/2004 | Regensburger et al. | ........ | 701/36 |
| 2008/0273757 A1 * | 11/2008 | Nakamura et al. | ............ | 382/104 |

FOREIGN PATENT DOCUMENTS

| | | |
|---|---|---|
| AU | 755 096 | 12/2002 |
| EP | 0 738 946 | 10/1996 |
| EP | 0 782 118 | 7/1997 |
| EP | 0 921 509 | 6/1999 |
| JP | U-5-23298 | 3/1993 |
| JP | A-2000-230834 | 8/2000 |
| JP | A-2003-036500 | 2/2003 |
| JP | A-2006-004270 | 1/2006 |
| JP | A-2006-38558 | 2/2006 |
| JP | A-2006-275690 | 10/2006 |
| JP | A-2006-330908 | 12/2006 |
| JP | A-2006-331217 | 12/2006 |
| JP | A-2007-041916 | 2/2007 |
| WO | WO 2006/080547 | 8/2006 |

OTHER PUBLICATIONS

European Search Report issued Oct. 2, 2009 in European Patent Application No. EP 08004628.7.

\* cited by examiner

*Primary Examiner* — Stephen R Koziol
(74) *Attorney, Agent, or Firm* — Oliff & Berridge, PLC

(57) ABSTRACT

Apparatuses, methods, and programs acquire vehicle position information that represents a current position of a vehicle, acquire image information of a vicinity of the vehicle, and carry out image recognition processing of a target feature that is included in the image information to determine a position of the target feature. The apparatuses, methods, and programs store recognition position information that is based on the acquired vehicle position information and that represents the determined recognition position of the target feature. The apparatuses, methods, and programs determine an estimated position of the target feature based on a set of a plurality of stored recognition position information for the target feature, the plurality of stored recognition position information for the target feature being stored due to the target feature being subject to image recognition processing a plurality of times.

15 Claims, 12 Drawing Sheets

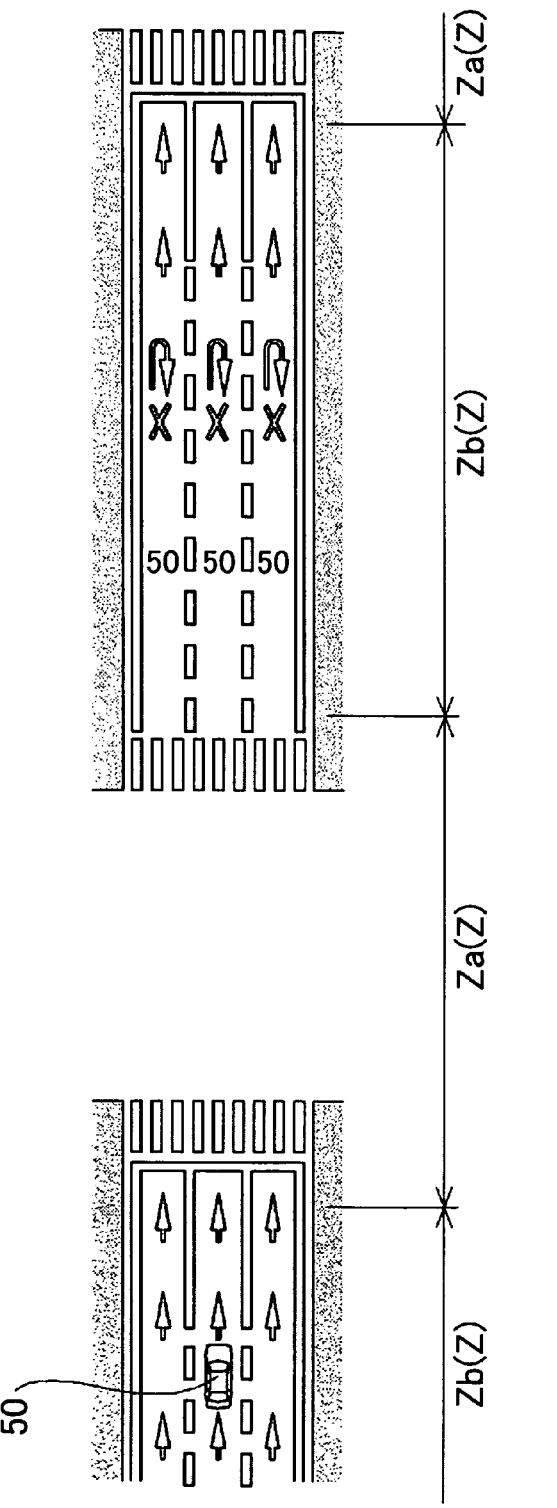

S1 — PREDICTIVE VALUE OF RECOGNITION RATE
S2 — APPEARANCE FREQUENCY
S3 — (table)

| FEATURE CLASS | APPEARANCE FREQUENCY | PREDICTIVE VALUE OF RECOGNITION RATE | RECOGNITION FREQUENCY | DISPOSITION TREND | PRIORITY ORDER |
|---|---|---|---|---|---|
| PEDESTRIAN CROSSING | 10.3 | 80% | 8.2 | END PORTION OF LINK Za | 1 |
| STOP LINE | 8.7 | 55% | 4.8 | END PORTION OF LINK Za | 2 |
| ARROW | 15.2 | 70% | 10.6 | MIDDLE PORTION OF LINK Zb | 1 |
| U-TURN PROHIBITION | 3.3 | 90% | 3.0 | MIDDLE PORTION OF LINK Zb | 2 |
| VEHICLE SPEED LIMIT | 3.1 | 80% | 2.5 | MIDDLE PORTION OF LINK Zb | 3 |

| FEATURE CLASS | APPEARANCE FREQUENCY | PREDICTIVE VALUE OF RECOGNITION RATE | RECOGNITION FREQUENCY | DISPOSITION TREND | PRIORITY ORDER |
|---|---|---|---|---|---|
| T-INTERSECTION | 9.8 | 90% | 8.8 | NODE :Zc | 1 |
| RIGHT-ANGLE INTERSECTION | 10.5 | 80% | 8.4 | NODE :Zc | 1 |
| STOP LINE | 19.6 | 55% | 10.8 | LINK :Zd | 1 |
| PEDESTRIAN CROSSING | 5.1 | 80% | 4.1 | LINK :Zd | 2 |
| PEDESTRIAN CROSSING PRESENT | 5.3 | 60% | 3.2 | LINK :Zd | 3 |

FEATURE INFORMATION COLLECTING APPARATUSES, METHODS, AND PROGRAMS

INCORPORATION BY REFERENCE

The disclosure of Japanese Patent Application No. 2007-091046, filed on Mar. 30, 2007, including the specification, drawings and abstract is incorporated herein by reference in its entirety.

BACKGROUND

1. Related Technical Fields

Related technical fields include feature information collecting apparatuses, methods, and programs.

2. Description of the Related Art

Conventionally, an apparatus is known that collects information about road features based on the image recognition. The apparatus recognizes target features that are included in image information acquired by an imaging device or the like that is mounted on the vehicle (refer, for example, to Japanese Patent Application Publications No. JP-A-2006-038558 and JP-A-2006-275690). The conventional apparatuses that are disclosed in Japanese Patent Application Publications Nos. JP-A-2006-038558 and JP-A-2006-275690 are both ones in which traffic signs and road traffic information display boards that are disposed along the road are included as target features. The apparatuses carry out image recognition of the target features that are included in the image information that has been acquired by an imaging device that is mounted on the vehicle. The feature information for the sign information and the like, which has been extracted from the recognition results, is stored in the map database in association with position information and segment information. The position information and the segment information that are associated with the feature information are determined based on information from a GPS receiver, a gyroscope, a vehicle speed sensor, or the like, which are generally used in a navigation apparatus. Thereby, a database for feature information is created, and route retrieval, driving assistance, and the like become possible based.

SUMMARY

However, the position information that is acquired by the GPS receiver, gyroscope, vehicle speed sensor, or the like that is used in the above navigation apparatus generally includes a large error of several meters to several tens of meters. Thus, the position information that is available when the feature information is stored in the map database may include this type of error. Therefore, during route retrieval, driving assistance, and the like that is carried out by referring to the feature information that has been stored in the database, these error can effect accuracy. Thus, there are cases in which it is not possible to carry out suitable operations due to the influence of such errors in the position information. In particular, when the feature information is used for vehicle control or vehicle position revision or the like, it is necessary to provide feature information that has a higher degree of precision and accuracy.

Exemplary implementations of the broad principles described herein provide apparatuses, methods, and programs that enable the acquisition of position information for road features at a higher precision and accuracy.

Exemplary implementations provide apparatuses, methods, and programs that acquire vehicle position information that represents a current position of a vehicle, acquire image information of a vicinity of the vehicle, and carry out image recognition processing of a target feature that is included in the image information to determine a position of the target feature. The apparatuses, methods, and programs store recognition position information that is based on the acquired vehicle position information and that represents the determined recognition position of the target feature. The apparatuses, methods, and programs determine an estimated position of the target feature based on a set of a plurality of stored recognition position information for the target feature, the plurality of stored recognition position information for the target feature being stored due to the target feature being subject to image recognition processing a plurality of times.

BRIEF DESCRIPTION OF THE DRAWINGS

Exemplary implementations will now be described with reference to the accompanying drawings, wherein:

FIGS. 9A and 9B show an example of the segments of the road zones and determining target features when the road class is an urban road;

DETAILED DESCRIPTION OF EXEMPLARY IMPLEMENTATIONS

Figure 1:
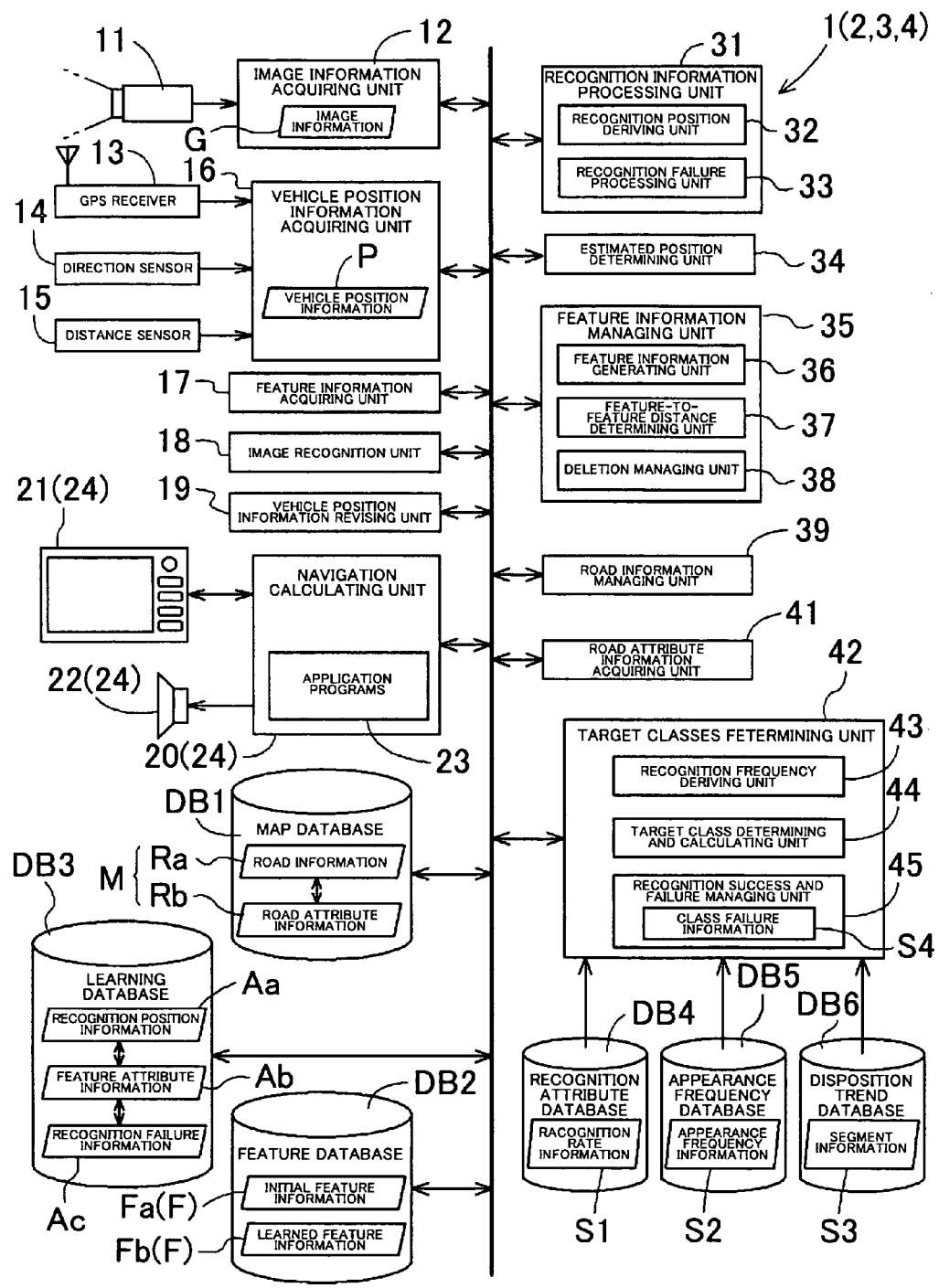
FIG. 1 is a block diagram that shows a schematic structure of an exemplary navigation apparatus.

FIG. 1 is a block diagram that shows the schematic structure of an exemplary navigation apparatus 1. This navigation apparatus 1 may physically, functionally, and/or conceptually include a feature information collecting apparatus 2, an image recognition apparatus 3, and a vehicle position recognition apparatus 4. The navigation apparatus 1 uses features of predetermined feature classes as the target features, and learns the positions of the features by detecting the target features with an image recognition unit 18. By reflecting such learned results for target features in a feature database DB2, it is possible to revise the vehicle position information P that is used in feature information F even for roads for which feature information F had not been prepared.

When the image recognition of the target features based on the feature information F (stored in the feature database DB2), has failed, the navigation apparatus 1 learns this, and corrects the feature information F by reflecting this failure in the feature database DB2. The navigation apparatus 1 carries out navigation processing such as route guidance and the like based on the revised vehicle position information P.

Each of the functional units of the navigation apparatus 1 that is shown in FIG. 1 may be structured by hardware, software (programs), or both, using the arithmetic processing apparatus of a CPU or the like as a controller. The functional units may include an image information acquiring unit 12, a vehicle position information acquiring unit 16, a feature information acquiring unit 17, an image recognition unit 18, a vehicle position information revising unit 19, a navigation calculating unit 20, a recognition information processing unit 31, an estimated position determining unit 34, a feature information managing unit 35, a road information managing unit 39, a road attribute information acquiring unit 41, and a target class determining unit 42. In addition, each of these functional units is structured so as to be able to exchange information with each other.

Each of the databases DB1 to DB6 of the navigation apparatus 1 is provided, as a hardware structure (memory), with an apparatus that has a recording medium that can store information and a drive apparatus therefore, such as, for example, a hard disk drive, a DVD drive that is provided with a DVD-ROM or a CD drive that is provided with a CD-ROM, or the like. Below, the structures of each of the units of the navigation apparatus 1 according to the present example will be explained in detail.

Figure 2:
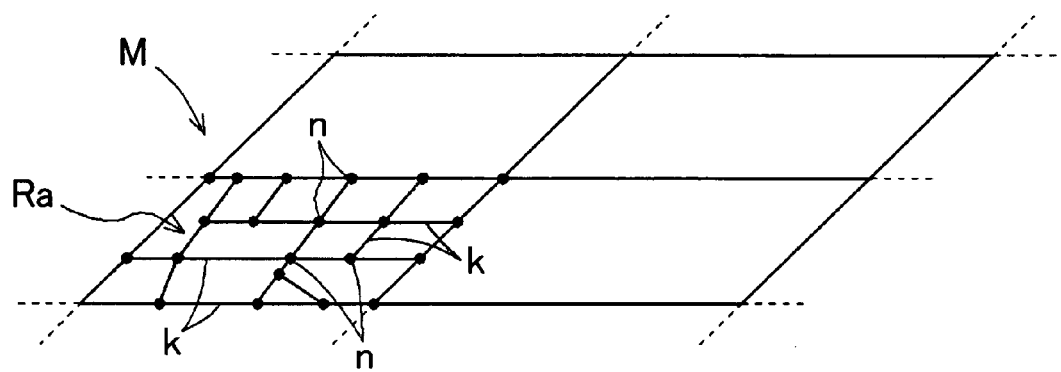
FIG. 2 is a drawing that shows an example of the structure of map information that is stored in a map database.

The map database DB1 is a database in which map information M that is divided into predetermined segments is stored. FIG. 2 shows an example of the structure of map information M that is stored in the map database DB1. As shown in FIGS. 1 and 2, the map information M includes road information Ra that represents a road network by the connection relationships between a plurality of nodes n that correspond to intersections and links k that correspond to the roads that join each of the intersections.

Each node n includes information for the position (coordinates) on a map in latitude and longitude. Each of the links k is connected via a node n. In addition, each of the links k includes, as attribute information, information such as the road type, the region class, the link length, the road width, and geometric interpolated points for representing the link geometry. Here, the road class information is information for the road type when the roads are divided into a plurality of classes, such as automobile-only roads, urban roads, narrow streets, mountain roads, and the like. In addition, the region class information is information for the region class, where a region that is provided with roads, which correspond to the links k, is divided into a plurality of segments. Such segments include, for example, regions such as the Kanto region or the Kansai region, or administrative divisions, such as Tokyo metropolis, prefectures, cities, towns, and villages. The attribute information for these links k corresponds to the road attribute information Rb (refer to FIG. 1). Note that in FIG. 2, only the road information Ra for one division is illustrated, and the road information Ra for the other divisions is omitted.

The feature database DB2 is a database in which information for various features that are provided on the road and in the vicinity of the road, that is, the feature information F, is stored. As shown in FIG. 1, in the present example, two types of information are stored in the feature database DB2: the initial feature information Fa and the learned feature information Fb. The initial feature information Fa denotes feature information F for a plurality of features that has been prepared and stored in advance in the feature database DB2. Such initial feature information Fa is prepared only for a portion of regions and roads, such as for large city areas and main roads and the like, among all of the regions for which map information M that includes road information Ra is prepared. In contrast, as will be described below, learned feature information Fb denotes feature information F that is stored in the features DB2 as a result of learning by using the image recognition results for the target features that have been obtained by the image recognition unit 18. Note that in the following explanation, the term "feature information F" used alone is a term that encompasses both the initial feature information Fa and the learned feature information Fb.

Figure 3:
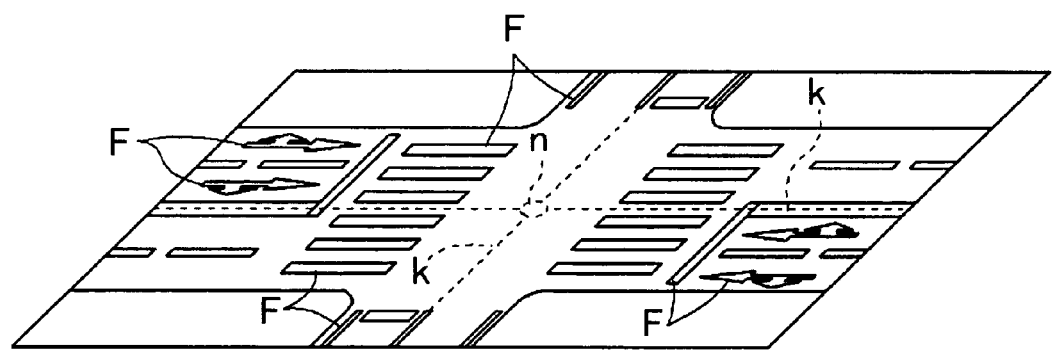
FIG. 3 is a drawing that shows an example of the feature information for road markings that are stored in a feature database.

Road markings (painted markings) that are provided on the surface of the road are included in the features for which feature information F is stored in the feature database DB2. FIG. 3 is a drawing that shows an example of the feature information F for road markings that are stored in the feature database DB2. Features associated with such road markings include, for example, pedestrian crossings, stop lines, vehicle speed markings that show the maximum vehicle speed, zebra zones, carriageway lines (including various types of carriageway markings such as solid lines, broken lines, double lines and the like) that separate lanes along the road, forward travel direction traffic carriageway markings (including arrow markings, for example, forward travel arrows and right turn arrows and the like) that indicate the forward travel direction for each lane. Note that features that are stored in the feature information F can include, in addition to such road markings, various features such as traffic signals, signs, overpasses, tunnels, and the like.

In addition, the feature information F includes, as content, the position information for each of the features and the feature attribute information that is associated therewith. Here, the feature position information includes information for the position (coordinates) on the map of representative points for each of the features that are associated with the links k and the nodes n that structure the road information Ra, and information for the orientation of each of the features. In the present example, the representative points are set in proximity to the center portion of each of the features in the lengthwise direction and the widthwise direction. In addition, the feature attribute information includes the feature class information and the feature contour information, such as the shape, size, color, and the like, of the features.

The feature class is information that represents the type of the features that have fundamentally identical contours, such as "pedestrian crossing," "stop lines," or "speed markings" (for example, "30 km/h"). In addition, in the present example, the feature information F includes associated information that represents the relationship with other approaching features and feature distance information that represents the distance between one feature and another feature. Here, the associated information is information that allows the anticipation of other features that are present in the forward direction due to recognizing one feature by image recognition while the vehicle 50 travels forward along the road (refer to FIG. 5). In addition, the feature distance information is information for accurately anticipating the distance from the vehicle 50 to such a feature that is present in the forward direction.

3.

The learning database DB3 is a database that stores the recognition position information Aa that has been derived by the recognition position deriving unit 32 and the recognition failure information Ac that has been derived by the recognition failure processing unit 33 such that the target features that correspond to the recognition position information Aa and the recognition failure information Ac can be distinguished. Here, in order to be able to distinguish the target features that correspond to each set of the information Aa and Ac, each set of the information Aa and Ac is stored in association with the feature attribute information Ab for the features that correspond thereto. The specific contents of the recognition position information Aa, the feature attribute information Ab, and the recognition failure information Ac that are stored in this learning database DB3 will be explained in detail below.

Figure 4:
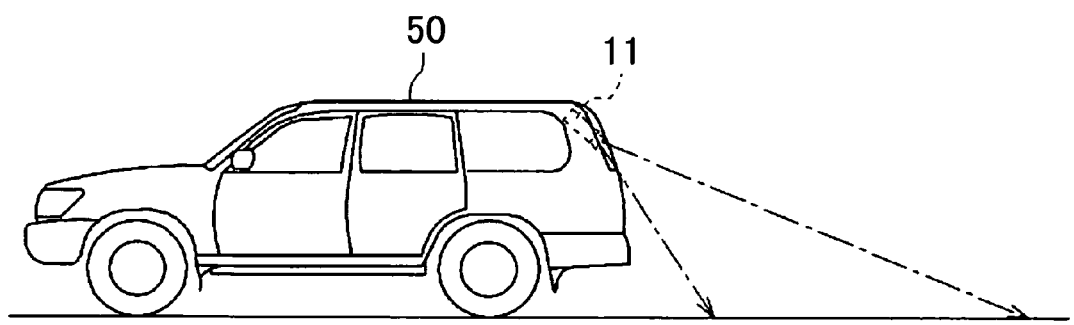
FIG. 4 is a drawing that shows an example of the configuration of an imaging device on a vehicle.

The image information acquiring unit 12 acquires image information G for the vicinity of the vehicle that has been photographed by the imaging device 11. Here, the imaging device 11 is, for example, a vehicle-mounted camera that is provided with an imaging element, and is provided at a position that enables photographing at least the surface of the road in the vicinity of the vehicle 50. It may be advantageous to use, for example, a back camera that photographs the road surface behind the vehicle 50, as shown in FIG. 4, as such an imaging device 11. The image information acquiring unit 12 captures via a frame memory (not illustrated) or the like photographic information that is photographed by the imaging device 11 at predetermined time intervals. The time interval for capturing the image information G at this time can be set at, for example, approximately 10 to 50 ms. Thereby, the image information acquiring unit 12 can continuously acquire a plurality of frames of image information G that has been photographed by the imaging device 11. Here, the acquired image information G is output to the image recognition unit 18.

5.

The vehicle position information acquiring unit 16 acquires vehicle position information P that represents the current position on the vehicle 50. Here, the vehicle position information acquiring unit 16 is connected to a GPS receiver 13, a direction sensor 14, and a distance sensor 15. The GPS receiver 13 receives GPS signals from GPS (Global Positioning System) satellites. These GPS signals are normally received at one second intervals and output to the vehicle position information acquiring unit 16. In the vehicle position information acquiring unit 16, the signals from the GPS satellites that have been received by the GPS receiver 13 are analyzed, and it is thereby possible to acquire information for the current position (latitude and longitude), the forward travel direction, the movement speed, and the like of the vehicle 50.

The direction sensor 14 is a sensor that detects the direction and changes in the direction of the vehicle 50. This direction sensor 14 is structured, for example, by a gyroscopic sensor, a geomagnetic sensor, an optical rotation sensor or a rotating type resistance volume sensor that is attached to the rotation portion of the steering wheel, an angle sensor that is attached to the wheel portions, or the like. In addition, the direction sensor 14 outputs the detected results to the vehicle position information acquisition unit 16. The distance sensor 15 is a sensor that detects vehicle speed and the movement distance of the vehicle 50. The distance sensor 15 is structured, for example, by a vehicle speed pulse sensor that outputs a pulse signal each time the drive shaft or the steering wheel of the vehicle rotates by a specified amount, or a yaw/G sensor that detects the acceleration of the vehicle 50 and a circuit that integrates this detected acceleration. In addition, the distance sensor 15 outputs information for the vehicle speed and the movement distance, which serves as the detected results, to the vehicle position information acquiring unit 16.

In addition, the vehicle position information acquiring unit 16 carries out the calculation in which the vehicle position is specified by well-known methods based on the output from the GPS receiver 13, the direction sensor 14, and the distance sensor 15. The vehicle position information acquiring unit 16 acquires the road information Ra in the vicinity of the position of the vehicle, which has been extracted from the map database DB1, and carries out revisions in which the vehicle position is matched with the road that is shown in the road information Ra by carrying out well-known map matching based thereon. In this manner, the vehicle position information acquiring unit 16 acquires the vehicle position information P that includes information for the current position of the vehicle 50 (latitude and longitude) and information for the forward travel direction of the vehicle 50.

The feature information acquiring unit 17 extracts and acquires feature information F for features that are present in the vicinity of the vehicle 50 from the feature database DB2 based on the vehicle position information P and the like that has been acquired by the vehicle position acquiring unit 16. In the present example, the feature information acquiring unit 17 extracts from the feature database DB2 the feature information F for the target features that are present from the present position of the vehicle 50 (shown in the vehicle position information P) to the end of the link k (represents the road along with the vehicle 50 is traveling based on the vehicle position information P). In addition, the feature information F that has been acquired by the features acquisition unit 17 is output to the image recognition unit 18 and the vehicle position information revising unit 19. Here, both the initial feature information Fa and the learned feature information Fb are included in the feature information F for the target features that are extracted from the feature database DB2 by the feature information acquiring unit 17. The features that serve as the target features are features that are the object of image recognition processing by the image recognition unit 5. In the present example, the features in a feature class that is selected from various types of road markings that are provided on the surface of a road, such as pedestrian crossings, stop lines, vehicle speed markings and the like serves as the target features.

The image recognition unit 18 carries out image recognition processing for the target objects that are included in the image information G acquired by the image information acquiring unit 12. In the present example, the image recognition unit 18 carries out two types of image recognition processing: position revising image recognition processing for use in the revision of the vehicle position information P, and information collecting image recognition processing for learning the image recognition results for target features and reflecting these results in the feature database DB2. In the present example, the image recognition unit 18 refers to the feature information F that has been acquired from the feature database DB2 by the feature information acquiring unit 17 based on the vehicle position information P.

Position revising image recognition processing is carried out when it has been determined that target features that have been stored as feature information F are present in the vicinity of the vehicle 50, and information collecting image recognition processing is carried out when it has been determined that target features that have been stored as feature information F are not present in the vicinity of the vehicle 50. This is because, as will be explained below, when the vehicle 50 is traveling along a road for which feature information F has already been prepared, revision processing of the vehicle position information P is carried out based the image recognition results, which are due to the position revising image recognition processing, and the feature information F, and correcting processing of the feature information F for the case in which the position revising image recognition processing has failed is carried out. When the vehicle 50 is traveling along a road for which feature information F has not been prepared, processing is carried out in which the positions at which target features are present are learned by using the image recognition results due to the information collecting image recognition processing. Note that in the present example, whether the target features that have been stored as feature information F are present in the vicinity of the vehicle 50 is determined by whether target features that have been stored as feature information F are present between the current position of the vehicle 50 and the end of the link k that represents the road along with the vehicle 50 is traveling.

In addition, in the position revising image recognition processing, the image recognition unit 18 carries out image recognition processing for the target features that are shown by the feature information F that is included in the image information G based on the feature information F for the target features that are present in the vicinity of the vehicle (acquired from the feature database DB2 based on the vehicle position information P). At this time, the image recognition unit 18 sets a predetermined recognition area E (refer to FIG. 6) for which the recognition request for the target features that are shown by the feature information F is to be carried out, and carries out image recognition processing of the target features on this image information G within this recognition area E.

The recognition area E is set as a position range in which it is presumed that target features will be present on the link k that is shown by the road information Ra. Here, the photographed areas of actual roads that are included in each set of the image information G can be found based on the vehicle position information P by using the positional relationships between the vehicle position (calculated in advance based on the installation position, the installation angle, and the angle of view of the imaging device 11 on the vehicle 50) and the photographed image. Thus, the image recognition unit 18 extracts each of the sets of the image information G that correspond to the recognition area E that has been set for each of the target features based on the information for the photographed areas of each of the sets of image information G that have been found in this manner, and then carries out image recognition processing. In addition, the image recognition results for the target features due to this position revising image recognition processing are used in the revision of the vehicle position information P obtained by the vehicle position information revising unit 19. In the position revising image recognition processing, the image recognition unit 18 also carries out image recognition of the target features outside the recognition area E that has been set for each of the target features. Such image recognition results for the target features that have been recognized outside the recognition area E are not used in the revision of the vehicle position information P, but, as will be explained below, are used in the correction of the feature information F.

In the information collecting image recognition processing, the image recognition unit 18 uses the features of the target classes that have been determined by the target class determining unit 42 (described below) as the target features and carries out image recognition processing of the target features that are included in the image information G. Because this image recognition processing is carried out without using the feature information F that has been stored in the feature database DB2, it is not possible to estimate the positions at which the target features are present. Therefore, in this information collecting image recognition processing, the image recognition unit 18 carries out image recognition processing of the target features of the target classes that have been determined for the road zones Z in each of the road zones Z depending on the target classes that have been determined by the target class determining unit 42 for each of the predetermined road zones Z (refer to FIG. 9 and FIG. 10).

The road zones Z are zones that are set on the nodes n and links k that are shown by the road information Ra, and depending on the road attributes of each of the roads (links k), these road zones Z are set, for example, as the link end portions Za and the link middle portions Zb, which are shown in FIG. 9, the nodes Zc and the links Zd, which are shown in FIG. 10, and the like. Here, as described above, the photographed areas of the actual roads that are included in each of the sets of the image information G can be found based on the vehicle position information P by using the positional relationships between the vehicle position that has been calculated in advance and the photographed area. Thus, the image recognition processing unit 18 extracts the image information G that corresponds to each of the road zones Z based on the information for the photographed areas of each of the sets of the image information G that has been found in this manner, and carries out image recognition processing of the target features of the target classes that have been determined for the road zones Z. In addition, the image recognition results for the target features obtained by this information collecting image recognition processing are used as the recognition position information by the recognition position deriving unit 32, which will be explained below, and stored in the learning database DB3.

During the recognition of the target features by image recognition, the image recognition unit 18 carries out binarization processing and edge detection processing on the image information G, and extracts the contour information for the features (road markings) that are included in the image information G. Subsequently, the image recognition unit 18 extracts the image of the target features that are included in the image information G by carrying out pattern matching between the extracted contour information for the feature and a characteristic amount for the shape of the target features. In addition, during the position revising image recognition processing, the image recognition unit 18 determines that the image recognition of the target features has succeeded when it has been possible to extract the images of target features from the image information G within the recognition area E that has been set. During the information collecting image recognition processing, the image recognition unit 18 determines whether the image recognition of the target features has succeeded when it has been possible to extract the images of the target features from the image information G of each of the road zones Z. In contrast, the image recognition unit 18 determines that the image recognition of the target features has failed when it has not been possible to extract images of the target features as a result of carrying out image recognition processing on all of the image information G within the recognition zone E or within each of the road zones Z.

The vehicle position information revising unit 19 revises the vehicle position information P based on the results of the image recognition processing for the target features that is obtained by the image recognition unit 18 and the position information for the target features that is included in the feature information F for the target features. In the present example, the vehicle position information revising unit 19 revises the vehicle position information P along the forward travel direction of the vehicle 50 by using the image recognition results for the target features that are obtained by the position revising image recognition processing based on the feature information F in the image recognition unit 18 and the position information for the target features that is included in the feature information F. Specifically, first, the vehicle position information revising unit 19 calculates the positional relationships between the vehicle 50 and the target features, which were available during the acquisition of the image information a that includes the image of the target features based on the result of the position revising image recognition processing obtained by the image recognition unit 18 and the installation position and installation angle, and the angle of view of the imaging device 11, and the like. Next, based on the calculated result of the positional relationships between the vehicle 50 and the target features, and the position information for the target features that are included in the feature information F for the target features, the vehicle position information revising unit 19 calculates and acquires high precision position information for the vehicle 50 based on the position information (feature information F) of the target features in the forward direction travel of the vehicle 50. In addition, based on the high precision position information for the vehicle 50 that has been acquired in this manner, the vehicle position information revising unit 19 revises the information for the current position of the vehicle 50 in the forward direction, which is included in the vehicle position information P that has been acquired by the vehicle position information acquiring unit 16. As a result, the vehicle position information acquiring unit 16 acquires the highly precise and accurate vehicle position information P after such revising.

The navigation calculating unit 20 is a calculation processing device that operates according to an application program 23 for executing navigation functions such as vehicle position display, retrieval of a route from the departure point to the destination point, course guidance to the destination point, destination retrieval, and the like. For example, the navigation calculating unit 20 acquires map information M for the vicinity of the vehicle 50 from the map database DB1 based on the vehicle position information P and displays an image of the map in the display input apparatus 21. At the same time, based on the vehicle position information P, the navigation calculating unit carries out processing in which the vehicle position mark is superimposed and displayed on the image of the map. The navigation calculating unit 20 carries out the retrieval of routes from a predetermined departure point to a destination point based on the map information M that is stored in the map database DB1. Furthermore, the navigation calculating unit 20 carries out course guidance for the driver by using one or both of a display input apparatus 21 and an audio output apparatus 22 based on the route from the departure point to the destination point that has been retrieved and the vehicle position information P.

In the present example, the navigation calculating unit 20 is connected to the display input apparatus 21 and the audio output apparatus 22. The display input apparatus 21 is one in which a display apparatus, such as a liquid crystal display, and an input apparatus, such as a touch panel, are integrated. The audio output apparatus is structured so as to include speakers and the like. In the present example, the navigation calculating unit 20, the display input apparatus 21, and the audio output apparatus 22 function as a guidance information output device 24 in the present invention.

The recognition information processing unit 31 is a recognition information processing device for carrying out processing for storing the information that represents the results of image recognition processing by the image recognition unit 18 in the learning database DB3. The stored information includes, the recognition position information that has been derived by a recognition position deriving unit 32 and the recognition failure information that is generated by a recognition features processing unit 33. Thus, in the present example, the recognition information processing unit 31 is provided with the recognition position deriving unit 32 and the recognition failure processing unit 33. The details of the processing that the recognition position deriving unit 32 and the recognition failure processing unit 33 carry out will be explained with reference to FIG. 5A-FIG. 8.

The recognition position deriving unit 32 derives the recognition position of the target features based on the vehicle position information P when the image recognition of the target features in the image recognition processing by the image recognition unit 18 succeeds. In addition, the recognition position deriving unit 32 generates recognition position information Aa that represents the derived recognition position and stores the results in the learning database DB3 so as to be able to distinguish the target features for which image recognition has been successful.

Figures 5A, 5B, 5C:
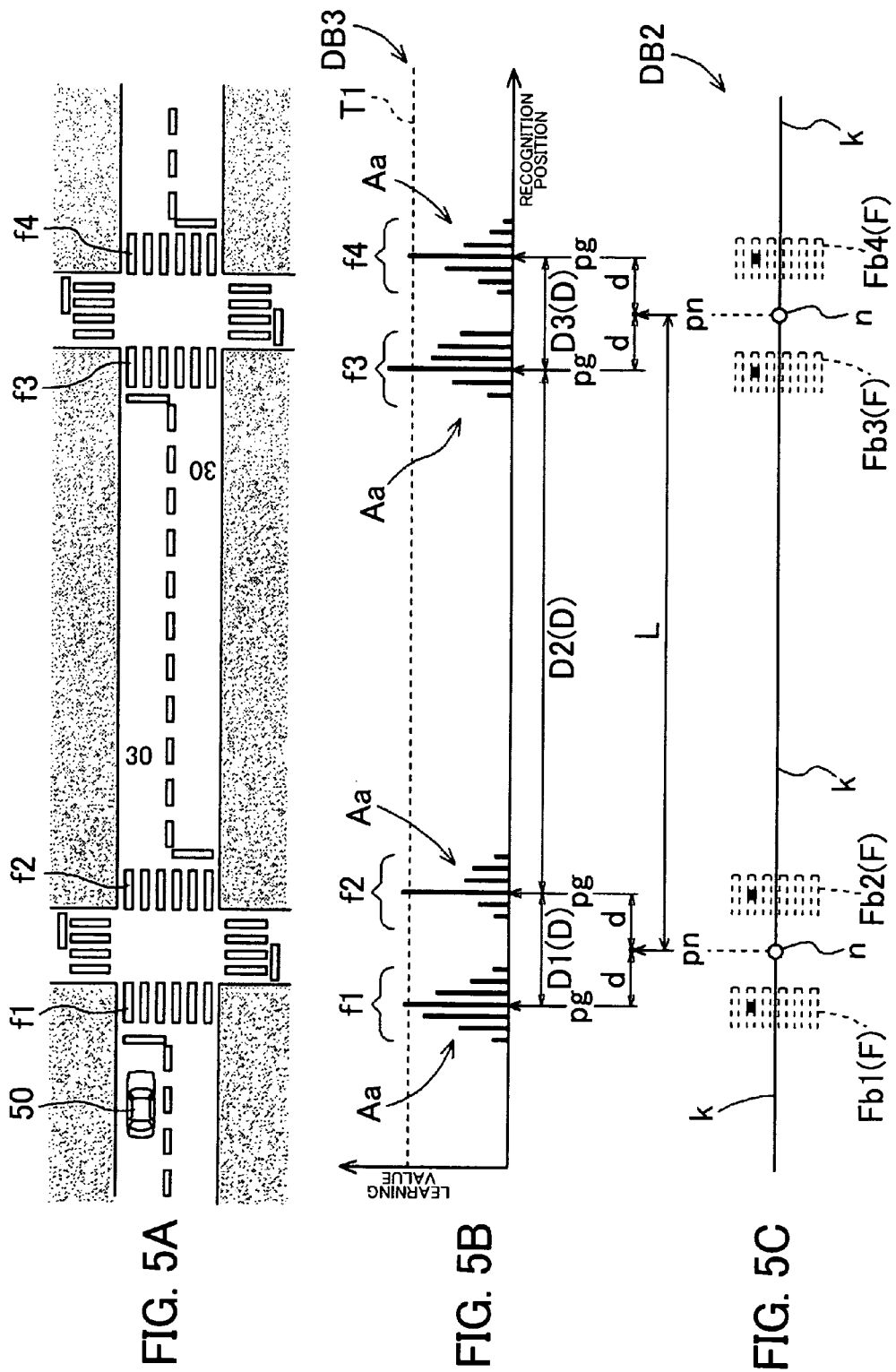
FIGS. 5A-5C are explanatory drawings showing an example of collecting feature information along a road for which feature information has not been prepared.

FIGS. 5A, 5B, and 5C are explanatory drawings for explaining the collecting process for the feature information F that used the results of the information collecting image recognition processing. An example is explained for the case in which the vehicle 50 is traveling along a road (link k) for which feature information F has not been prepared. FIG. 5A is an example of the road markings (features) that are provided on an actual road along which the vehicle 50 is traveling. FIG. 5B is an example of recognition position information Aa that has been stored in the learning database DB3. FIG. 5C is an example of the feature database DB2 in which the learned results that have been stored in the learning database DB3 have been reflected. In FIGS. 5A, 5B, and 5C, in order to simplify the explanation, the example that is shown is the case in which the target class in all illustrated areas is the same "pedestrian crossing," and, as shown in FIG. 9 and FIG. 10, the target classes in each of the predetermined road zones Z (Za to Zd) are the same.

As shown in FIG. 5B, in the present example, the recognition position deriving unit 32 generates the recognition position information Aa for each of the target features as a learning value for predetermined position ranges to which the recognition positions of the target features obtained by the image recognition unit 18 belong, adds this learning value to each of the position ranges each time a target feature is recognized, and stores the results. Below, the recognition position processing will be explained sequentially with reference to FIGS. 5A and 5B.

First, the recognition position deriving unit 32 monitors whether the image recognition of the target features by image recognition by the image recognition unit 18 has succeeded during the information collecting image recognition processing, in which features of the target classes that have been determined by the target class determining unit 42 are set as the target features. In this example, the information collecting image recognition processing is carried out in which all of the features for which the feature class is "pedestrian crossing" are used as the target feature. Thus, in the example that is shown in FIG. 5A, the vehicle 50 should recognize by image recognition the pedestrian crossings f1 to f4 as target features at four locations in the forward travel direction.

When the image recognition of one target feature by the image recognition unit 18 has succeeded, the recognition position deriving unit 32 derives the recognition position of the target feature based on this image recognition result. Here, the recognition position deriving unit 32 derives the recognition position of the target features as information that represents the positions of the target features on the road based on the vehicle position information P. Therefore, the recognition position deriving unit 32 calculates the positional relationships between the vehicle 50 and the target features that were available during the acquisition of the image information G, which includes the image of the target features, based on the image recognition results for the target features obtained by the image recognition unit 18 and the installation position and the installation angle, the angle of view, and the like of the imaging device 11.

Next, based on the calculated results of the positional relationships between the vehicle 50 and the target features, and the vehicle position information P that was available during the acquisition of the image information G, the vehicle position information revising unit 19 calculates the position of the target features, which is based on the vehicle position information P. In this example, the recognition position deriving unit 32 uses the position of the target features as the position of a representative position of the target features in the direction along the link k that represents the roads along which the vehicle 50 is traveling. In addition, the recognition position deriving unit 32 derives the positions of the target features that have been calculated in this manner as the recognition positions for the target features. Because the recognition positions of these target features are derived based on the vehicle position information P that was available during the acquisition of the image information G, which included the image of the target features, the recognition positions become information for the position that reflects the error that is included in the vehicle position information P.

Next, the recognition position deriving unit 32 uses the recognition positions of the target features that have been derived as the learning values for predetermined position ranges, and uses the learning values for the position ranges as the recognition position information Aa. In this example, the predetermined position ranges are ranges that have been partitioned and set in units having a predetermined distance in a direction along the link k. For example, the predetermined position range may be a range that has been partitioned into 0.5 m units in the direction along the link k. A learning value is a value that is added to the position ranges to which the recognition position of the target features in the learning database DB3 belong each time the image recognition of one target feature has succeeded. For example, the learning value is one point each time that the image recognition of one target feature has succeeded. Specifically, in the present example, the recognition position information Aa is structured by information that represents the position range that includes the recognition position of the target features and information for the learning value of "1."

Figure 7:
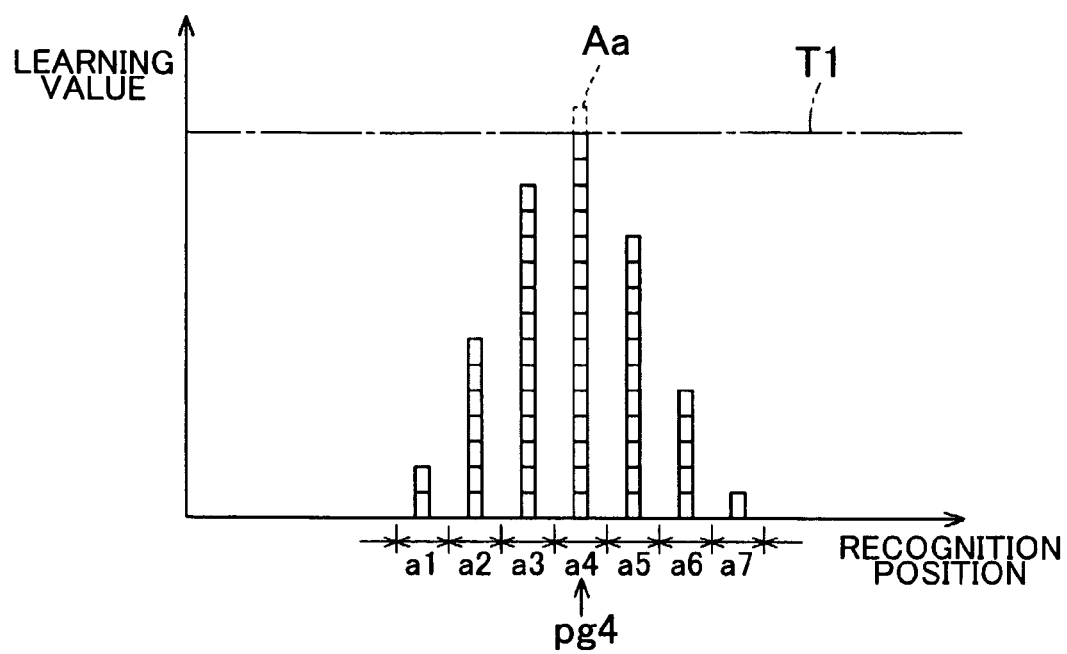
FIG. 7 is an expanded drawing of an exemplary learning value that is stored in the learning database that is shown in FIG. 5B.

FIG. 7 shows the learning database DB3 that is shown in FIG. 5B, related to the pedestrian crossings f1. For example, the example in FIG. 5A is the case in which the image recognition of the pedestrian crossing f1 that serves as the target feature has succeeded. When the recognition position of the pedestrian crossing f1 that has been derived by the recognition position deriving unit 32 is the position range that is shown as "a4" in FIG. 7, as shown by the broken line, a "1" is added to the learning value of the position range a4. In addition, when the same target feature (for example, the pedestrian crossing f1) has been repeatedly recognized by image recognition a plurality of times due to the vehicle 50 passing along the same road a plurality of times, in the learning database DB3, as shown in FIG. 5B and FIG. 7, learning values serve as a plurality of sets of recognition position information Aa that is generated each time the target feature is recognized, and these learning values are summed for each of the position ranges that represent the recognition positions of the recognition target objects, and accumulated. In addition, as will be explained below, when the learning values have become equal to or greater than the predetermined threshold learning value T1, the learned feature information Fb for the target features is generated by the feature information generating unit 36, and stored in the feature database DB2. In the example in FIGS. 5A, 5B, and 5C, as shown in FIG. 5C, the sets of learned feature information Fb1 to Fb4 that correspond to the pedestrian crossings f1 to f4 are stored in the feature database DB2.

The recognition position deriving unit 32 carries out processing that is similar to the collecting processing for the feature information F that used the results of the information collecting image recognition processing described above when the target features are recognized by image recognition outside the recognition area E that has been set for each of the target features during the position revising image recognition processing by the image recognition unit 18. Specifically, based on the image recognition results for the target features obtained by the position revising image recognition processing, the recognition position deriving unit 32 derives the recognition position of target features, which is based on the vehicle position information P. The recognition position deriving unit 32 generates the recognition position information Aa that represents the derived recognition position, and stores this recognition position information Aa in the learning database DB3 so as to be able to distinguish the target features for which image recognition was successful. Thereby, as will be explained below, it is possible to carry out the correcting of the feature information F that has been stored in the feature database DB2 by using the image recognition results for the target features in the position revising image recognition processing. Note that the details of the processing by the recognition position deriving unit 32 for the case in which the recognition of target features by image recognition outside the recognition area E that has been set by the position revising image recognition processing will be explained below in detail by using the example that is shown in FIGS. 6A-6C.

In this connection, the recognition position deriving unit 32 stores the generated recognition position information Aa in association with the feature attribute information Ab that represents the classes of the target features in order to be able to distinguish the target features for which image recognition has been successful from the other target features. Here, the attributes of the target features that are included in the feature attribute information Ab may be information that enables the distinguishing of one target feature from another target feature. Therefore, for example, the feature attribute information Ab is provided with one or more sets of information selected from among the feature class of the target features, the specific shape and size of the target features, the link ID of the links k at which the target features are present, the approximate position at which the target features are present, and the like. Such information that structures the feature attribute information Aa for the target features is generated based on the image recognition results for the target features obtained by the image recognition unit 18 and the vehicle position information P that was available during the acquisition of the image information G according to the image recognition processing and the like.

The recognition failure processing unit 33 generates recognition failure information Ac that represents that the image recognition of the target features that are shown by the feature information F has failed when the image recognition of the target features that are shown by the feature information F has failed in the position revising image recognition processing by the image recognition unit 18, and stores the results in the learning database DB3 so as to be able to distinguish the target features for which the image recognition has failed. Specifically, the recognition failure processing unit 33 carries out recognition failure processing, which includes the generation of recognition failure information Ac and storing the same in the learning database DB3.

Figure 6A:
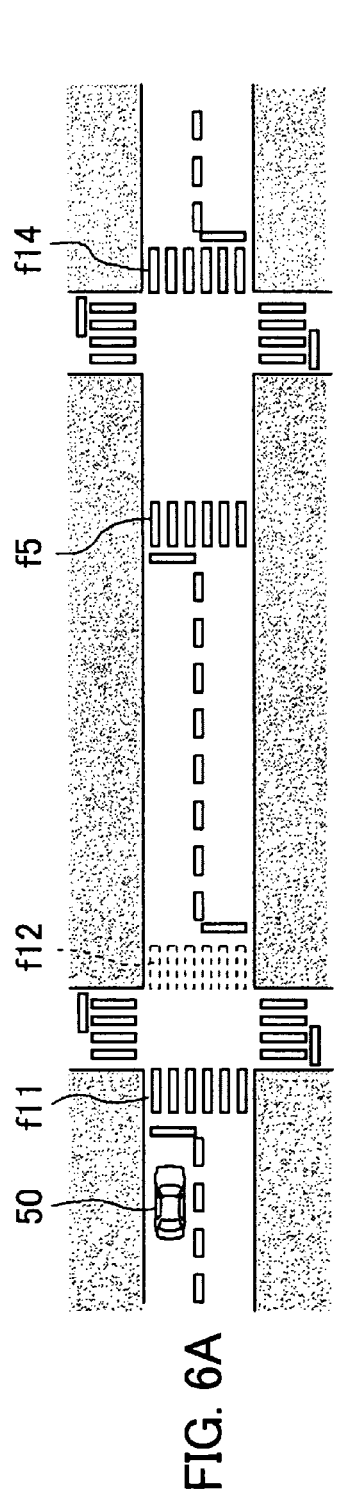
FIGS. 6A-6C are explanatory drawings showing an example of correcting feature information along a road for which feature information has already been prepared.
Figure 6B:
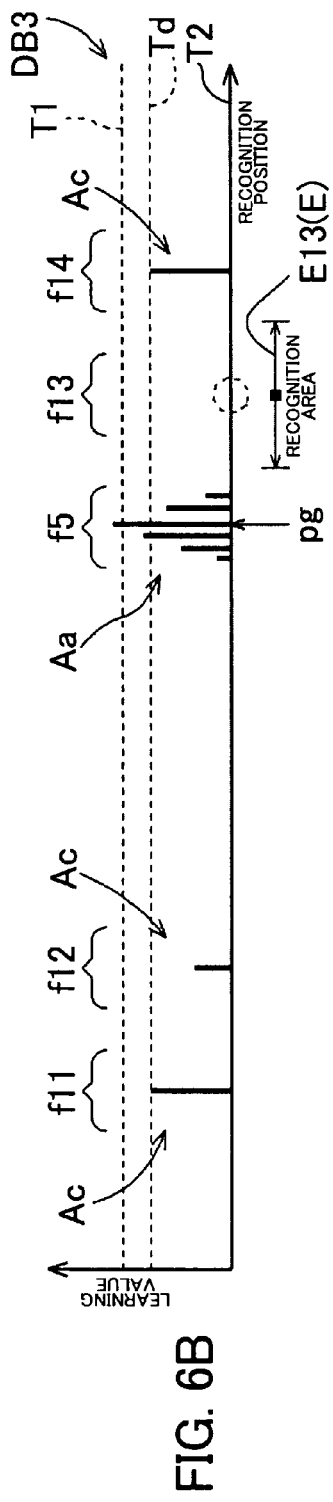
Figure 6C:
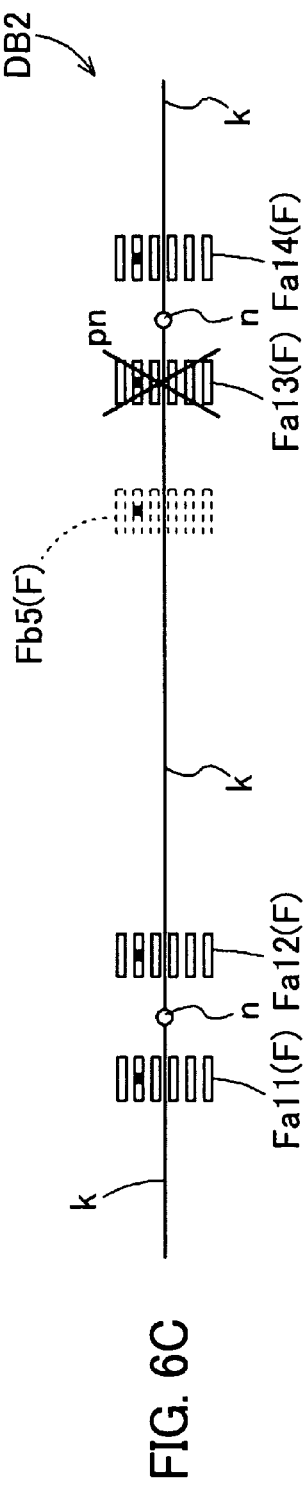

FIGS. 6A, 6B, and 6C are explanatory drawings of an example of the vehicle 50 traveling along a road (link k) for which feature information F has already been prepared, and explain an outline of the correction processing for the feature information F that used the result of the position revising image recognition processing. FIG. 6A is an example of road markings (features) that are provided on an actual road along which the vehicle 50 travels. FIG. 6B is an example of the recognition position information Aa and the recognition failure information Ac that are stored in the learning database DB3. FIG. 6C is an example of the feature database DB2 in which the learned results that are stored in the learning database DB3 are reflected. In FIGS. 6A, 6B, and 6C, an example is shown of a case in which position revising image recognition processing is carried out by using the four "pedestrian crossings" that are shown by the initial feature information Fa11 to Fa14 in FIG. 6C as the target features.

In the present example, as shown in FIG. 6B, the recognition failure processing unit 33 generates recognition failure information Ac for each of the target features as learning values for the target features, decrements learning values for the target features each time the image recognition of the target features fails, and stores the results. Below, the content of the processing that is carried out by the recognition failure processing unit 33 will be explained sequentially with reference to FIGS. 6A-6C.

First, the recognition failure processing unit 33 monitors whether the image recognition of the target features within the predetermined recognition area E that is set for the target features has succeeded during position revising image recognition processing for the target features that are shown in the feature information F by the image recognition unit 18. In this example, when the vehicle 50 is traveling along a road (link k) for which initial feature information Fa has been prepared, the image recognition unit 18 carries out sequentially an image recognition request in which the four "pedestrian crossing," which are respectively shown by the initial feature information Fa11 to Fa14, are used as the target features. However, as shown in FIG. 6A, in this example, the pedestrian crossing f12 that is shown by the initial feature information Fa12 has faded and disappeared, and the pedestrian crossing that is shown by the initial feature information Fa13 has completely disappeared. Thus, an example will be explained in which, for the faded pedestrian crossing f12, the image recognition fails at a predetermined ratio, and for the pedestrian crossing that is shown by initial feature information Fa13, which has been completely deleted, the image recognition fails every time. In addition, during position revising image recognition processing of target features that are shown by the feature information F by the image recognition unit 18, the recognition failure processing unit 33 monitors whether target features that are outside the recognition area E that has been set for each of the target features have been recognized by image recognition. In the present example, outside of the recognition area E13 that has been set for the target feature (pedestrian crossing) that is shown by the initial feature information Fa13, a pedestrian crossing f5 for which initial feature information Fa has not been prepared is provided, and this pedestrian crossing f5 is subject to image recognition.

In the present example, in the learning database DB3, an initial value Td of the leaning value for the target features that are shown by each set of the initial feature information Fa are set and stored according to the initial feature information Fa that has been prepared and stored in advance in the feature database DB2. In the example that is shown in FIG. 6B, the initial value Td of the learning value is set to a value that is lower than the learning threshold value T1. In addition, when the image recognition of the target features that are shown by the initial features Fa has failed, the recognition failure processing unit 33 generates recognition failure information Ac for the target features as learning values for the target features, and each time the image recognition of the target features fails, the initial value Td of the learning values for the target features that are stored in the learning database DB3 is decremented sequentially and stored. Here, for example, the initial value Td is decremented by one point each time the image recognition of a target feature fails one time. Specifically, in this example, the recognition failure information Ac is structured by information that can specify the target feature that is shown by the initial feature information Fa or the initial feature information Fa itself, and the information for the learning value "1."

Here, the initial value Td of the learning value that has been stored in the learning database DB3 and the recognition failure information Ac that is generated by the recognition failure processing unit 33 are stored in association with the feature attribute information Ab that shows the various attributes of the target features in order to be able to distinguish the target features for which the image recognition has failed from the other target features. This feature attribute information Ab is information that is similar to that which has been stored in association with the recognition position information Aa.

Figure 8:
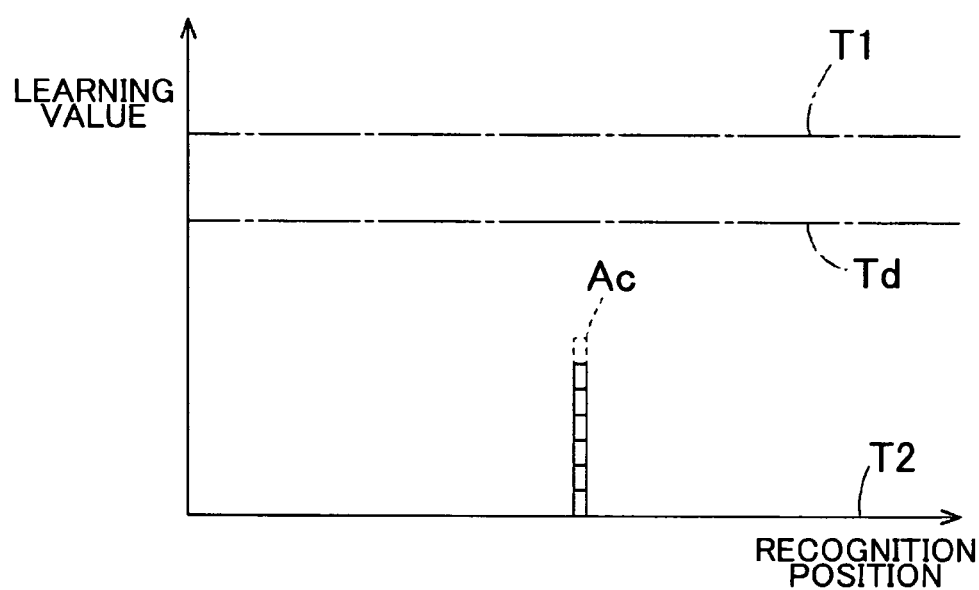
FIG. 8 is an expanded drawing of the an exemplary learning value that is stored in the learning database that is shown in FIG. 6B.

FIG. 8 is an enlarged drawing of a portion of the learning value that has been stored in the learning database DB3 that is shown in FIG. 6B, which is related to the pedestrian crossing f12 (initial feature information Fa12). For example, in the example in FIG. 6A, when the image recognition of the pedestrian crossing f12, which serves as the target feature that is shown by the initial feature information Fa12, has failed, as shown by the broken line in FIG. 8, the learning value for the target feature is decremented by 1. In addition, when the image recognition of the same target feature fails a plurality of times due to the vehicle 50 traveling along the same road a plurality of times, the learning value is decremented until finally reaching zero, similar, for example, to the learning value of the pedestrian crossing f13 that is shown by the initial feature information Fa13 in FIG. 6B.

In the present example, as will be explained below, because the deletion threshold value is set to zero, when the learning value reaches zero, the initial feature information Fa that shows this target feature is deleted from the feature database DB2 by a deletion managing unit 38. In the example in FIG. 6, because the learning value for the pedestrian crossing f13 that is shown by the initial feature information Fa13 reaches zero, the initial feature information Fa13 is deleted from the feature database DB2.

Note that in the present example, even when the recognition failure processing unit 33 fails the image recognition of the target feature that is shown by the learned feature information Fb by image recognition during position revising image recognition processing, the processing in which the recognition failure information Ac for the target feature is stored in the learning database DB3 is not carried out. However, it may be advantageous to use a structure in which, when learned feature information Fb is newly generated and stored in the feature database DB2, similar to the initial feature information Fa, an initial value Td for the learning value is also set for the learned feature information Fb, and instead of the learning value that serves as the recognition position information Aa, the initial value Td of the learning value is stored in the learning database DB3. In this case, when the image recognition of target features that are shown by the learned feature information Fb fails, the recognition failure processing unit 33 generates recognition failure information Ac for the target features as learning values for the target features, and each time the image recognition of the target features fails, the initial value Td of the learning values for the target features, which are stored in the learning database DB3, are decremented sequentially and stored. Thereby, the learned feature information Fb can be treated similarly to the initial feature information Fa.

In contrast, when image recognition of the target features that are shown by the feature information F succeeds within the predetermined recognition area E that has been set for the target features during the position revising image recognition processing by the image recognition unit 18, the recognition failure processing unit 33 does not carry out the storage of the learning value as recognition failure information Ac. In the example in FIGS. 6A, 6B, and 6C, because the image recognition for the pedestrian crossing f11 that is shown by the initial feature information Fa11 and the pedestrian crossing f14 that is shown by the initial feature information Fa14 has succeeded, as shown in FIG. 6B, the learning value for the pedestrian crossings f11 and f14 that have been stored in the learning database DB3 is maintained as-is at the initial value Td.

During the position revising image recognition processing, the recognition failure processing unit 33 carries out processing that determines whether the target features outside the recognition area E that has been set for each of the features have been recognized by image recognition. When target features outside the recognition area E have been recognized by image recognition, as described above, the recognition position deriving unit 32 carries out processing that is similar to the collection processing for feature information F that used the results of the information collecting image recognition processing. Specifically, based on the image recognition results for the target features by the position revising image recognition processing unit, the recognition position deriving unit 32 derives the recognition positions of the target features, which are based on the vehicle position information P. In addition, the recognition position deriving unit 32 generates recognition position information Aa that represents the derived recognition positions, and stores this recognition position information Aa in the learning database DB3 such that the target features for which image recognition is successful can be distinguished.

In the example in FIG. 6, the pedestrian crossing f5 for which initial feature information Fa has not been prepared is provided ahead of the vehicle 50 in the forward travel direction for the recognition area E13 that has been set for the target feature (pedestrian crossing), which is shown by the initial feature information Fa13. Thereby, in the present example, this pedestrian crossing f5 is a target feature that has been recognized by image recognition outside the recognition area E that has been set for each of the target features. In this case, processing is carried out that is similar to the collection processing for feature information F that used the result of the information collecting image recognition processing by the recognition position deriving unit 32 instead of the recognition failure processing unit 33. Specifically, the recognition position deriving unit 32 adds the learning value as recognition position information Aa for the pedestrian crossing f5 to the position range to which the recognition position of this pedestrian crossing f5 in the learning database DB3 belongs each time the image recognition of the pedestrian crossing f5 succeeds. In addition, when the pedestrian crossing f5 has been recognized by image recognition a plurality of times due to the vehicle 50 traveling along the same road a plurality of times, as shown in FIG. 6B, a plurality of learning values that serve as the recognition position information Aa that has been generated each time the pedestrian crossing f5 has been recognized is summed and accumulated in the learning database DB3.

When the learning value for the pedestrian crossing f5 has become equal to or greater than the predetermined threshold value T1, the estimated position pg is determined by the estimated position determining unit 34. In addition, as shown in FIG. 6C, the learned feature information Fb5 is generated by the feature information generating unit 36, and stored in the feature database DB2. According to the structure of the present example, it is possible to correct the feature information F that has been stored in the feature database DB2 suitably so as to conform to actual conditions by deleting initial feature information Fa from, and adding learned feature information Fb to, the feature database DB2 as described above.

In addition, the recognition failure processing unit 33 stores the generated recognition failure information Ac in association with the feature attribute information Ab that represents the various attributes of the target features so as to be able to distinguish the target features for which the image recognition has failed from other target features. This feature attribute information Ab is information similar to that which is stored in association with the recognition position information Aa.

The estimated position determining unit 34 functions as an estimated position determining device that determines the estimated position pg (refer to FIG. 5) of the target features based on the plurality of sets of recognition position information Aa, for the same target features, that has been stored in the learning database DB3 due to the same target features being recognized by image recognition a plurality of times. Here, based on the distribution of a plurality of sets of recognition position information Aa, for the same target features, the estimated position determining unit 34 determines the representative values of this distribution that are to be used as the estimated position pg of the target feature. In the present example, the mode values are used as the representative values of the distribution.

Specifically, the estimated position determining unit 34 determines the position that represents the position range for which the learning value has first become equal to or greater than the predetermined learning threshold value T1 to be the estimated position pg of the target feature. Thereby, when the estimated position determining unit 34 has determined the estimated position pg for one target feature, the estimated position determining unit 34 determines the position representing the position range that has a mode value to be the estimated position pg of the target feature. This determination is based on the distribution of the learning value that is used as the recognition position information Aa, for the target features, that is stored in the learning database DB3. As one example, the determination method for the case in which the estimated position pg of the pedestrian crossing f1 in the example of FIG. 5 is determined will be explained. As shown in FIG. 7, the learning value that is used as the recognition position information Aa for the pedestrian crossing f1 is the one that has first become equal to or greater than the learning threshold value T1 in the position range a4. Therefore, the estimated position determining unit 34 determines the position that represents the position range a4, for example, the center position pg4 of the of the position range a4, to be the estimated position pg of the pedestrian crossing f1.

The feature information managing unit 35 carries out the management of the feature information F that has been stored in the feature database DB2 based on the learned results for the target features that have been stored in the learning database DB3. In the present example, this feature information managing unit 35 is provided with a feature information generating unit 36, a feature distance determining unit 37, and a deletion managing unit 38. These will be explained separately below.

The feature information generating unit 36 functions as a feature information generating device that generates learned feature information Fb based on the learned results for features that have been stored in the learning database DB3. Specifically, the feature information generating unit 36 generates learned feature information Fb that associates the position information, which represents the estimated positions pg for each of the target features that have been determined by the estimated position determining unit 34, and the feature attribute information, which is based on the image recognition result for the target object that has been obtained by the image recognition unit 18. Here, in the learning database DB3, the feature attribute information that structures the learned feature information Fb is generated by using the content of the feature attribute information Ab that has been stored in association with the recognition position information Aa for the target features. Thereby, the learned feature information Fb, similar to the initial feature information Fa, is generated as position information and information that is provided with feature attribute information that has been associated therewith. In addition, the learned feature information Fb that has been generated by this feature information generating unit 36 is stored in the feature database DB2. In the present example, the learned feature information Fb1 to Fb4 that is shown in FIG. 5C and the learned feature information Fb5 that is shown in FIG. 6C are generated by the feature information generating unit 36 and stored in the feature database DB2. Note that the black squares (n) that are shown in these figures represent the estimated positions pg of each of the target features that are shown by the position information for each set of the learned feature information Fb1 to Fb5.

The feature distance determining unit 37 determines the feature distance D, which represents the distance between two target features, based on a plurality of sets of recognition position information Aa for the two target features. In the present example, the feature distance determining unit 37 finds the feature distance D between these two target features by calculating the distance between the estimated position pg for one target feature and the estimated position pg for the other target feature by using the information for the estimated positions pg for the two target features that has been determined by the estimated position determining unit 34. In the example that is shown in FIG. 5B, the feature distance determining unit 37 finds the distance between two target features that are adjacent to each other. Specifically, in this example, the feature distance determining unit 37 finds the distance by determining the feature distance D1 between the pedestrian crossing f1 and the pedestrian crossing f2, the feature distance D2 between the pedestrian crossing f2 and the pedestrian crossing f3, and the feature distance D3 between the pedestrian crossing f3 and the pedestrian crossing f4.

The information for the feature distance D that has been determined by the feature distance determining unit 37 structures the learned feature information Fb that is generated by the feature information generating unit 36, described above. Specifically, in the present example, the learned feature information Fb for each of the target features is generated so as to include associated information that represents the relationship between the target features and other adjacent target features and feature distance information that represents the feature distances D between other target features. These sets of information have a content that is identical to the associated information and the feature distance information that is included in the initial feature information Fa.

The deletion managing unit 38 carries out processing in which feature information F that has been stored in the feature database DB2 is deleted based on the learned results for the target features that have been stored in the learning database DB3. Specifically, the deletion managing unit 38 carries out the deletion of feature information F for the target features that have been stored in the feature database DB2 based on a plurality of sets of recognition failure information Ac for each of the target features that has been stored in the learning database DB3 due to having carried out image recognition processing on the same target feature a plurality of times. Specifically, the deletion managing unit 38 carries out the deletion of feature information F for the target features when the learning value for each of the target features becomes equal to or less than the predetermined deletion threshold value T2. As described above, in the present example, the deletion threshold value T2 is set to zero. Therefore, the deletion managing unit 38 carries out processing in which feature information F for the target features is deleted from the feature database DB2 when the learning value, which serves as the recognition failure information Ac for one target feature and is stored in the learning database DB3, becomes zero.

In addition, in the present example, because the recognition failure information Ac for learned feature information Fb is not stored in the learning database DB3, the deletion managing unit 38 carries out processing in which only the initial feature information Fa is deleted from the feature database DB2. In the example that is shown in FIG. 6, the deletion managing unit 38 deletes the initial feature information Fa13 from the feature database DB2 when the learning value of the pedestrian crossing f13 that is shown by the initial feature information Fa13 has become zero. Note that, as described above, when a structure is used in which, similar to the initial feature information Fa, the recognition failure information Ac is stored in the learning database DB3, the deletion managing unit 38 carries out processing in which learning feature information Fb is also deleted from the feature database DB2.

The road information managing unit 39 functions as a road information managing device that carries out processing in which one or both of the road information Ra and the road attribute information Rb that are stored in the map database DB1 are corrected. In the present example, the road information managing unit 39 corrects one or both of the position information for nodes n that are included in the road information Ra and the length information for the link k that connects two nodes n. At this time, the road information managing unit 39 carries out the determination of one or both of the position of nodes n and the length of a link k based on position information that represents the estimated positions pg that have been determined by the estimated position determining unit 34 for the two target features that surround a node n and are disposed at substantially equal distances from this node n. Here, pedestrian crossings, for example, exemplify target features that surround a node n and are disposed a substantially equal distances from the node n.

Generally pedestrian crossings are disposed at substantially equal distances on both sides of a node n, which represents the center of the intersection. This is because the pedestrian crossings are generally provided at the boundary portion between the intersection and the road. Therefore, as shown, for example, in FIG. 5B, if the estimated positions pg of the two pedestrian crossings that are present in proximity to the node n are found by the estimated position determining unit 34 based on the recognition position information Aa that has been stored in the leaning database DB3, it can be estimated that the center position, which is at equal distances d from the estimated positions pg of the two pedestrian crossings, is the node position pn at which the node n is positioned.

Similarly, if it is possible to find the node position pn for the node n that is positioned at the end of the link k on the side opposite to this node n, it can be estimated that the distance between these two nodes positions pn corresponds to the link length L. When the node position pn and the link length L that have been found in this manner differ from what is shown in the road information Ra that is stored in the map database DB1, the road information managing unit 39 carries out processing in which the road information Ra is corrected so as to conform thereto. Thereby, it is possible to make the road information Ra that has been stored in the map database DB1 appropriately conform to actual conditions by using the learned results for the target features.

The road attribute information acquiring unit 41 functions as a road attribute information acquiring device that acquires the road attribute information Rb for a road (link k) along which the vehicle 50 is traveling from the map database DB1 based on the vehicle position information P. As described above, the road attribute information Rb that is stored in the map database DB1 includes information such as the road class, the region class, the link length, the road width, the geometric interpolated points for representing the link geometry, and the like. In addition, from among these, the road attribute information acquiring unit 41 acquires information that is necessary for the determination of the target classes by the target class determining unit 42, which will be described below, as road attribute information Rb from the map database DB1.

In the present example, the road attribute information acquiring unit 41 acquires the road class information and the region class information as road attribute information Rb. As described above, the road class information is information for the road type when the roads have been divided into a plurality of classes, such as automobile-only roads, urban roads, narrow streets, mountain roads, and the like. In addition, the region class information is information for the regional class when a region has been divided into a plurality of segments that are provided with roads that correspond to the links k. Such regions include, for example, the Kanto region or the Kansai region, or governmental administrative divisions such as Tokyo metropolis, prefectures, cities, towns, and villages. Therefore, the road attribute information acquiring unit 41 acquires information such as, for example, "road class: urban road; regional class: Aichi Prefecture," as the road attribute information Rb for the road (link k) along which the vehicle 50 is traveling.

The recognition attribute database DB4 is a database that stores the recognition rate information S1 as recognition attribute information for all feature classes that can become target classes, and functions as a recognition attribute information storing device. Here, the recognition rate information S1 is information that represents the predictive value of the recognition rate for features of each of the feature classes during information collecting image recognition processing by the image recognition processing unit 18, which is assigned based on properties that are unique to each of the feature classes. Specifically, the recognition rate information S1 is information that represents the theoretical ratio at which recognition should succeed when carrying out image recognition of target features of each of the feature classes.

Examples of the properties that are unique to each of the feature classes that influence the recognition rate of each of the feature classes include the shape, the size, the color, and ease of fading and the like of each of the feature classes. For example, in relation to the shape of a feature, the recognition rate tends to increase for feature classes that have a low possibility of being mistakenly recognized as another feature class and that have characteristic shapes to be easily recognized. In relation to the size of the feature, the recognition rate tends to increase because the possibility that the feature is included in the image information G that has been photographed by the imaging device 11 increases as the size of the feature increases in the widthwise direction of the road.

With respect to the color, the recognition rate tends to increase as the contrast with the color of the surface of the road increases. In addition, in relation to the ease of fading of the feature, the possibility that the image recognition will fail increases as the possibility that fading will occur increases, and thus the recognition rate tends to decrease. Note that the ease of fading for each of the feature classes is found statistically based on the results of site surveys that relate to the degree that the features of each of the feature classes fade. In addition, the recognition rate information S1 for each of the feature classes that is stored in the recognition attribute database DB4 is information that represents the predictive value of the recognition rate that has been determined in advance based on the properties that are unique to each of these feature classes.

The appearance frequency database DB5 is a database that stores appearance frequency information S2 that represents the appearance frequency of each of the feature classes according to the road attributes that are shown by the road attribute information Rb for all feature classes that can become target classes, and functions as an appearance frequency information storing device. Here, the appearance frequency information S2 is information that represents the appearance frequency of features for each feature class on the roads (links k) having a plurality of road attributes shown by the road attribute information Rb.

In the present example, as described above, the road class information and the region class information are used as the road attribute information Rb. Thus, the appearance frequency information S2 for each of the feature classes is determined for all combinations of road class information and region class information in the appearance frequency database DB5. The appearance frequency for each of the feature classes according to such road attributes is found statistically based on the results of site surveys related to the feature classes of the features that are present on the roads having each of the road attributes. In the present example, this appearance frequency information S2 is set as information that is represented by the number of appearances of features in each of the feature classes per unit length of the road, and more specifically, as information that is represented by the number of appearances of the features per 1 kilometer of road. Therefore, for example, assume the appearance frequency information S2 is "10.3," in which the road attribute is "road class: urban road; region class: Aichi Prefecture" the and feature class is "pedestrian crossing." In this case, the appearance frequency information S2 indicates that statistically 10.3 pedestrian crossings are provided per 1 kilometer of road length on an urban road in Aichi Prefecture.

Figures 10A, 10B:
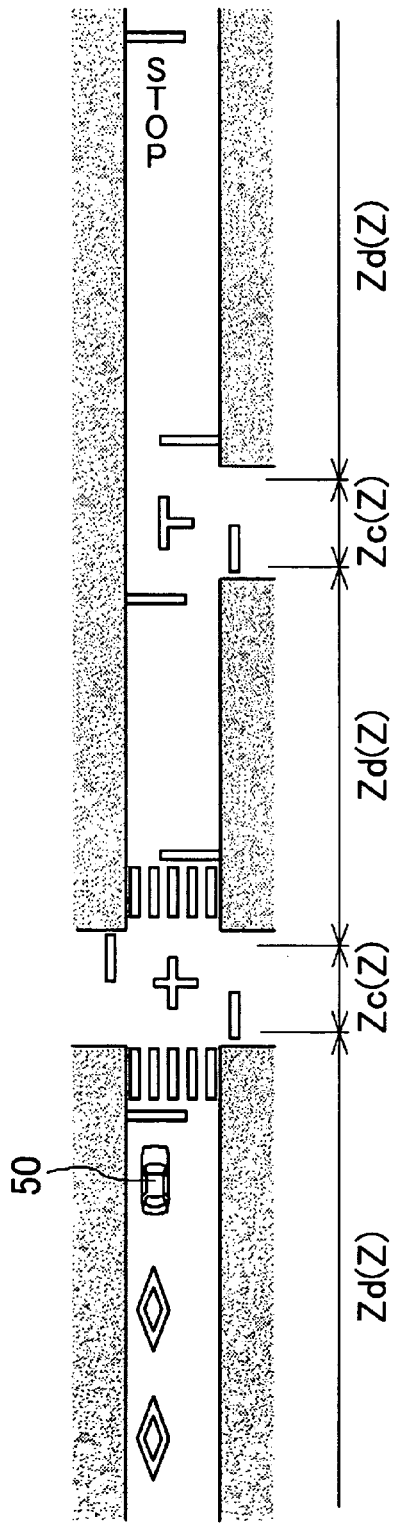
FIGS. 10A and 10B is a drawing that shows an example of the segments of the road zones and determining target features when the road class is a narrow road.

The disposition trend database DB6 is a database that stores the segment information S3 for each of the feature classes as disposition trend information that represents disposition trends of the features on the road for all feature classes that can become target classes. Here, the segment information S3 is information that represents whether there is a high possibility that features in each of the feature classes will be disposed in any of a plurality of road zones Z that have been divided in the longitudinal direction of the road (link k) based on the intersection (node n). Specifically, the segment information S3 is information that represents the road zones Z in which there is a high possibility that features for each of the feature classes will be disposed. In the present example, as shown in FIG. 9A-FIG. 10B, the segment information S3 is divided into road zones Z that differ according to the road class that is shown by the road attribute information Rb. Specifically, here, for an urban road, as shown in FIG. 9A, the road (link k) is divided, in the longitudinal direction thereof, into two road zones Z: the "link end portion Za" that corresponds to the end portion area of the road, and the "link middle portion Zb" that corresponds to the middle portion area of the road. In addition, as shown in FIG. 10A, for narrow streets, the road (link k) is divided, in the longitudinal direction thereof, into two road zones Z: the "on node Zc" that corresponds to the middle area of the intersection and a "on link Zc" that corresponds to the area on the road that is outside of the intersection. In addition, as a concrete example of the segment information S3 that is stored in the disposition trend database DB6, road zones Z that are shown by the segment information S3, for which the feature class is a "pedestrian crossing," include a "link end portion Za" for an urban road and a "on link Zc" for a secondary road.

The target class determining unit 42 determines the target class based on the road attribute information Rb that has been acquired by the road attribute information acquiring unit 41 and the recognition attribute information for each of the feature classes that has been determined in advance in relation to the image recognition processing. Here, the target class is one or more feature classes that serve as the target of the information collecting image recognition processing by the image recognition unit 18.

In the present example, the target class determining unit 42 determines the target classes by selecting target classes from among the feature classes for various types of road markings that are provided on the surface of a road, such as pedestrian crossings, stop lines, and vehicle speed markings and the like. In addition, in order to carry out the determination of such target classes appropriately, in the present example, the target class determining unit 42 is provided with a recognition frequency deriving unit 43, a target class determination calculating unit 44, and a recognition success and failure managing unit 45. Examples of the processing that is carried out by each of these units will be explained with reference to FIGS. 9A-10B. FIGS. 9A and 9B show an example of the division of the road zones Z and the target class determining processing when the road class is an urban road.

FIGS. 10A and 10B show a concrete example of the division of the road zones Z and the target class determining processing when the road class is a narrow road. FIG. 9A and FIG. 10A show a concrete example of the division of the road zones Z and FIG. 9B and FIG. 10B show a concrete example of the target class determining processing.

The recognition frequency deriving unit 43 derives the recognition frequency for each of the feature classes based on the appearance frequency of each of the feature classes according to the road attribute that is shown by the road attribute information Rb, which has been acquired by the road attribute information acquiring unit 41, and the degree of the ease of recognition during the image recognition processing of each of the feature classes that are shown by the recognition attribute information. Thus, in the present example, the recognition frequency deriving unit 43 first searches the appearance frequency database DB5 based on the road attribute information Rb that has been acquired by the road attribute information acquiring unit 41, and acquires the appearance frequency information 52 that represents the appearance frequency for each of the feature classes according to the road attributes that are shown by the road attribute information Rb. Here, the recognition frequency deriving unit 43 acquires appearance frequency information S2 according to combinations of road class and region class for each of the feature classes based on the road attribute information Rb, which has been acquired by the road attribute information acquiring unit 41 and represents the road class information and the region class information for the road (link k) on which the vehicle 50 is currently traveling.

Specifically, for example, when "road class: urban road; region class: Aichi Prefecture" is acquired as the road attribute information Rb for the road (link k) along which the vehicle 50 is traveling, as shown in FIG. 9B, the appearance frequency information S2 for the plurality of feature classes that correspond to combinations of this road class and region class is acquired from the appearance frequency database DB5. In the example, the information consisting of "pedestrian crossings: 10.3," "stop lines: 8.7," "arrows: 15.2," "U-turns prohibition: 3.3," "vehicle speed limit: 3.1" is acquired as the appearance frequency information S2 for each of the feature classes.

In addition, when, for example, "road class: narrow road; region class: Tokyo City" has been acquired as the road attribute information Rb for the road (link k) along which the vehicle 50 is traveling, as shown in FIG. 10B, the appearance frequency information S2 for the plurality of feature classes that correspond to these combinations of road class and region class is acquired from the appearance frequency database DB5. In the example, the information consisting of "T-intersections: 9.8," "right-angle intersections: 10.5," "stop lines: 19.6," "pedestrian crossings: 5.1," "pedestrian crossings present: 5.3" is acquired as the appearance frequency information S2 for each of the feature classes. Note that in these figures, in order to simplify the explanation, an example is shown in which the appearance frequency information S2 for five types of feature class is acquired, whereas actually, appearance frequency information S2 for more numerous feature classes can be acquired.

Next, the recognition frequency deriving unit 43 acquires the recognition rate information S1 as recognition attribute information for each of the feature classes from the recognition attribute database DB4. Here, the recognition frequency deriving unit 43 acquires the recognition rate information S1 by searching the recognition attribute database DB4 for the plurality of feature classes for which the appearance frequency information S2 has been acquired as described above. Specifically, in the example that is shown in FIG. 9B, the information consisting of "pedestrian crossings 80%," "stop lines: 55%," "arrows: 70%," "U-turns prohibition: 90%," and "vehicle speed limit: 80%" is acquired as recognition rate information S1 for each of the feature classes. In addition, as shown in FIG. 10B, the information consisting of "T-intersections: 90%," "right-angle intersections: 80%," "stop lines: 55%," "pedestrian crossings: 80%," and "pedestrian crossings present: 60%" is acquired as recognition rate information S1 for each of the feature classes.

Subsequently, the recognition rate deriving unit 43 derives the recognition frequency for each of the feature classes based on the appearance frequency information S2 and the recognition rate information S1 that have been acquired. In the present example, as shown in formula (1) below, the recognition frequency deriving unit 43 finds the value that is obtained by multiplying the appearance frequency for each of the feature classes that are shown by the appearance frequency information S2 by the predictive value of the recognition rate for the features for each of the feature classes that are shown by the recognition rate information S1 as the recognition frequency.

$$(\text{recognition frequency}) = (\text{appearance frequency}) \times (\text{predictive value of recognition rate}) \quad (1)$$

Specifically, this recognition rate is found as the value that corresponds to the weighted appearance frequency, which is obtained by multiplying the appearance frequency of the feature of each of the feature classes according to the road attributes of the road (link k) along which the vehicle 50 is traveling by the predictive value of the recognition rate in the image recognition processing of the features in each of the feature classes, where the predictive value serves as a weight. Thereby, the recognition frequency is information that represents the comprehensive recognition rate of the features for each of the feature classes when carrying gout image recognition processing of a feature while the vehicle 50 is traveling along the road (link k) having the road attributes that are shown by the road attribute information Rb.

In the example that is shown in FIG. 9B, when the feature class is "pedestrian crossing," the recognition frequency is found to be "8.2," which is obtained by multiplying the "appearance frequency: 10.3" by the "predictive value of the recognition rate 80%." Similarly, the recognition frequencies for each of the feature classes are found to be "stop lines: 4.8," "arrows: 10.6," "U-turns prohibition: 3.0," and "vehicle speed limit: 2.5." In addition, in the example that is shown in FIG. 10B, the recognition frequencies of each of the feature classes are found to be "T-intersections: 8.8," "right-angle intersections: 8.4," "stop lines: 10.8," "pedestrian crossings: 4.1," and "pedestrian crossings present: 3.2." The recognition frequency deriving unit 43 derives the recognition frequency for each of the feature classes as described above.

The target class determining and calculating unit 44 determines the target classes, which are one or more feature classes that are used as the target of the information collecting image recognition processing, based on the recognition frequencies for each of the feature classes that have been derived by the recognition frequency deriving unit 43. In the present example, according to the recognition frequency for each of the feature classes that have been derived by the recognition frequency deriving unit 43, among all of the feature classes that can become a target class, the target class determining and calculating unit 44 determines one or more feature classes for which the recognition frequency is highest to be the target class. However, at this time, based on the segment information S3 that is used as the disposition trend information for the features for each of the feature classes, the target class determining and calculating unit 44 determines the target class by prioritizing the feature classes for which the disposition trend that is shown by the segment information S3 of each of the feature classes matching the disposition on the road (link k) on which the vehicle 50 is traveling, which is based on the vehicle position information P. Thus, in the present example, the target class determining and calculating unit 44 refers to the segment information S3 for each of the feature classes that have been stored in the disposition trend database DB6, partitions the feature classes for each road zone Z that is shown by each set of the segment information S3, and determines the priority order of each of the feature classes in a sequence starting from the recognition frequencies that are highest.

In the example of the urban road that is shown in FIG. 9, among the plurality of the feature classes for which the recognition frequencies have been derived by the recognition frequency deriving unit 43, for "pedestrian crossing" and "stop lines," the road zone Z that is shown by the segment information S3 is "link end portion Za," and for the "arrows," "U-turns prohibition," and "vehicle speed limit," the road zone Z that is shown by the segment information S3 is "link middle portion Zb." Thus, in a sequence that starts from the recognition frequencies that are highest among the feature classes of the road zone Z, the target class determining and calculating unit 44 determines the priority order of each of the feature classes for which the road zone Z is "link end portion Za" to be "pedestrian crossing: 1" and "stop lines: 2." In a sequence that starts from the recognition frequencies that are highest among the feature classes of the road zone Z, the target class determining and calculating unit 44 determines the priority sequence of each of the feature classes for which the road zone Z is "link middle portion Zb" to be "arrows: 1," "U-turns prohibition: 2," and "vehicle speed limit: 3." Note that in the example that is shown in FIG. 9A, the zone in proximity to the intersection (node n) that includes pedestrian crossings and stop lines that are disposed on both sides of the intersection (node n) is set to "link end portion Za," and the other zones of the roads (link k) are set to "link middle unit Zb."

In the example of the narrow road that is shown in FIG. 10, among the plurality of feature classes for which the recognition frequency has been derived by the recognition frequency deriving unit 43, for the "T-intersection" and the "right-angle intersections," the road zone Z that is shown by the segment information S3 is "on node Zc," and for the "stop lines," the "pedestrian crossing," the "pedestrian crossing present," the road zone Z that is shown by the segment information S3 is "on link Zc." Thus, in a sequence that starts from the recognition frequencies that are highest among the feature classes of the road zone Z, the target class determining and calculating unit 44 determines the priority sequence for each of the feature classes for which the road zone Z is "on node Zc" to be "T-intersections: 1" and "right-angle intersections: 1."

Note that in the present example, irrespective of whether the values of the recognition frequencies are different, both the priority orders of the "T-intersection" and the "right-angle intersections" are set to "1." This is because the "T-intersection" and the "right-angle intersections" do not conflict because they are not disposed at the same position, and furthermore, because these features share a common shape, it is possible to carry out image recognition processing in which both are simultaneously used as target classes by using shared image recognition processing. In addition, in a sequence that starts from the recognition frequencies that are highest among the feature classes of the road zone Z, the target class determining and calculating unit 44 determines the priority order for each of the feature classes for which the road zone Z is "on link Zc" to be "stop lines: 1," "pedestrian crossings: 2," and "pedestrian crossings present: 3." Note that in the example that is shown in FIG. 10A, the zone of the road (link k) that includes the pedestrian crossing and the stop lines that are disposed on both sides of the intersection (node n) is set to "on link Zc," and the zones in proximity to the other intersections (node n) are set to "on node Zc."

In addition, based on the priority order of each of the feature classes for each of the road zones Z, the target class determining and calculating unit 44 determines the target class for each of the road zones Z. In the present example, the target class determining and calculating unit 44 determines the feature class for which the priority order of each of the road zones Z is "1" to be the target class. Thereby, in the example that is shown in FIGS. 9A and 9B, a feature class for which the road zone Z is a "link end portion Za" is determined to be "pedestrian crossing," and a feature class for which the road zone Z is "link middle portion Zb" is determined to be "arrows." In addition, in the example that is shown in FIGS. 10A and 10B, a feature class for which the road zone Z is "on node Zc" is determined to be "T-intersection" and "right-angle intersection," and a feature class for which the road zone Z is "on link Zc" is determined to be "stop lines."

In the present example, during the determination of the feature classes described above, the target class determining and calculating unit 44 refers to the class failure information S4 that is stored in the recognition success and failure managing unit 45, and determines the target classes based on the success or failure information of the image recognition of the target features in the past. At this time, first, the target class determining and calculating unit 44 searches the recognition success and failure managing unit 45 based on the vehicle position information P, and extracts the class failure information S4 for the road zone Z along which the vehicle 50 is traveling. As will be described below, in the present example, the class failure information S4 is information representing that image recognition for the feature of a target feature, which has been determined for each road zone Z, has failed in the past, and includes information that represents the feature class for which image recognition has failed and information that represents predetermined road zones Z that correspond to the area in which the image recognition has failed.

In addition, when the class failure information S4 for the road zone Z along which the vehicle 50 is traveling has been acquired, the target class determining and calculating unit 44 carries out an adjustment in which the priority order of the feature classes for the road zones Z are modified such that the rank of the feature class that is shown by the class failure information S4 becomes lower. Specifically, the target class determining and calculating unit 44 modifies the priority order such that the rank of the feature class that is shown by the class failure information S4 becomes the lowest. In addition, at this time, the target class determining and calculating unit 44 moves up the priority order of the other feature classes sequentially. The target class determining and calculating unit 44 determines the feature class for which the priority order after modification is "1" to be the target class. For example, in the example that is shown in FIGS. 9A and 9B, assume that in the specified road zone Z of the link middle portion Zb in the forward travel direction of the vehicle 50, the class failure information S4, which represents that the image recognition of the target class "arrows" has failed in the past, is to be acquired. In this case, the target class determining and calculating unit 44 carries out a modification in which the priority order for "arrows" is set to the lowest rank. Thereby, in the priority order in the specified road zones Z, "U-turn prohibited" is moved up to "1," and the "vehicle speed limit" is moved up to "2." Thus, in this case, the target class determining and calculating unit 44 determines the target class to be "U-turn prohibited," in accordance with the priority order after modification.

The recognition success and failure managing unit 45 manages the information for the success and failure of image recognition of target features in the past in relation to information collecting image recognition processing. Thus, based on the vehicle position P, the recognition success and failure managing unit 45 generates class failure information S4 as recognition success and failure information that represents the success or failure of the image recognition of target features for the target class that has been determined by the target class determining and calculating unit 44 for each road zone Z (an example of a predetermined area), and stores the class success and failure information S4 that has been generated.

In the present example, the class success and failure information S4 is information that represents the fact that image recognition has failed when the target feature was completely unrecognizable by image recognition in all of the road zones Z in relation to the information collecting image recognition processing of the target features of the target classes that have been determined by the target class determining and calculating unit 44 in the past for each of the road zones Z. Thus, in the present example, the class failure information S4 includes information that represents the feature classes for which image recognition has failed and information that represents the specified road zone Z that corresponds to the area in which the image recognition has failed. Here, the "specified road zone Z" that is included in the class failure information S4 is information that can specify one road zone Z in which the image recognition has failed, and differs from information that simply specifies only the class of the road zone Z, such as "link end portion Za" and "link middle portion Zb," as in the case of the segment information S3 that is stored in the disposition trend database DB6. Thus, the "specified road zone Z" that is included in this class failure information S4 is found based on the vehicle position information P and the road information Ra when the vehicle has passed through the specified road zone Z in which the image recognition failed, and for example, is used as information that is associated with a specified link k in which the specified road zone Z is present.

In addition, the recognition success and failure managing unit 45 calculates the number of times that the image recognition has failed in relation to the image recognition processing of target features for the specified road zone Z, and generates and stores the class failure information S4 when failure has continuously occurred a predetermined number of times (for example, 1 time, 5 times, 10 times, and the like). Thereby, the target classes for the specified road zone Z are modified after the specified number of failures has occurred in the image recognition of a features of a target classes that have been determined by the target class determining and calculating unit 44 for a specified road zone Z. Thereby, it becomes possible to carry out the image recognition of target features efficiently during information collecting image recognition processing, and it becomes possible to carry out the learning of the target features efficiently.

19. Operational Processing of the Navigation Apparatus

Next, an exemplary feature information management method will be explained with respect to FIGS. 11-13. The exemplary method may be implemented, for example, by one or more components of the above-described apparatus 1. However, even though the exemplary structure of the above-described apparatus 1 may be referenced in the description, it should be appreciated that the structure is exemplary and the exemplary method need not be limited by any of the above-described exemplary structure.

Figure 11:
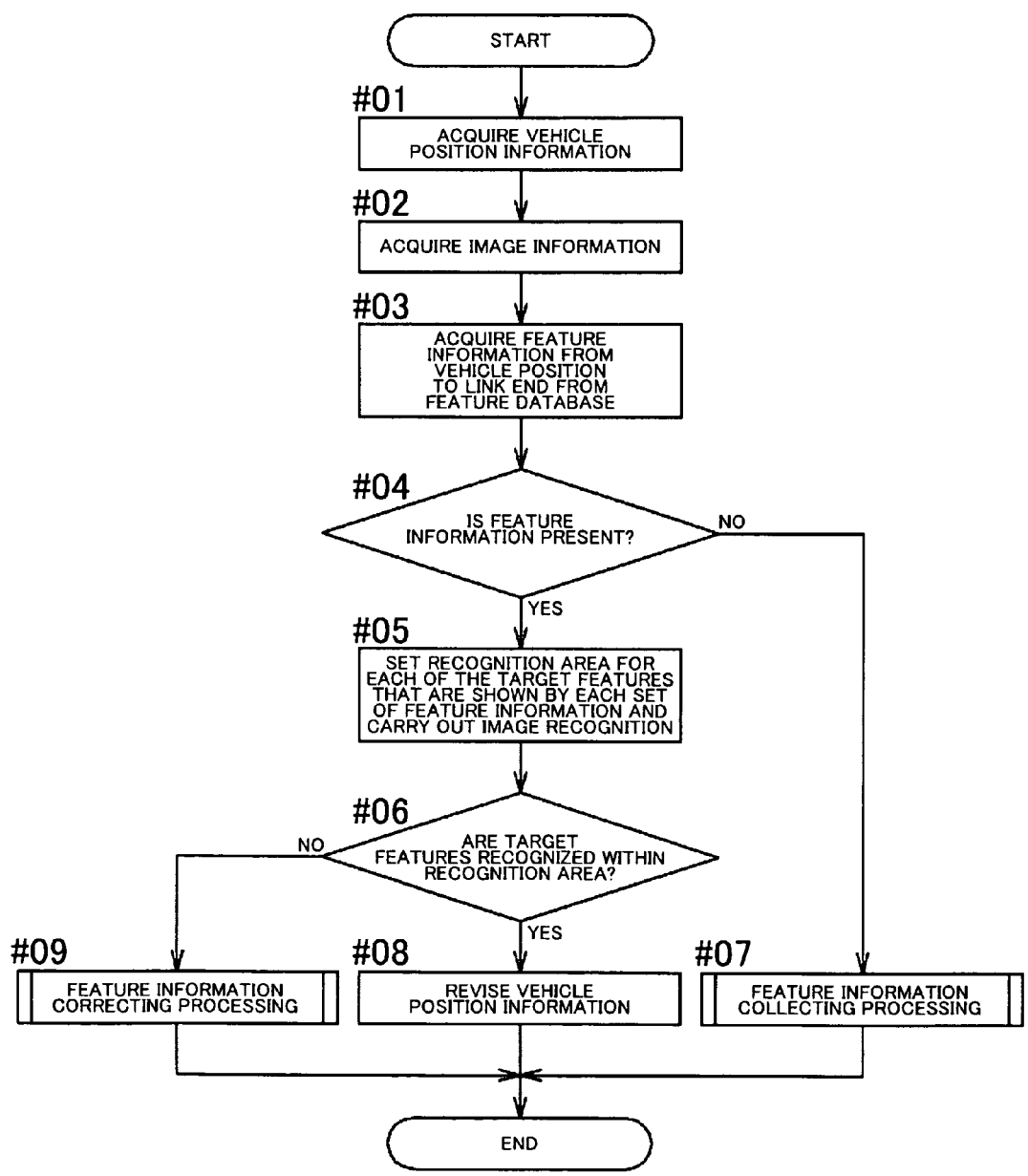
FIG. 11 is a flowchart that shows an exemplary feature information management method.

As shown in FIG. 11, in the navigation apparatus 1, first, the vehicle position information P is acquired by the vehicle position information acquiring unit 16 (step #01). Next, the image information G for the vicinity of the vehicle 50, which has been photographed by the imaging apparatus 11, is acquired by the image information acquiring unit 12 (step #02). Subsequently, the feature information F for the target features that are present between the current position (vehicle position) of the vehicle 50, which is shown by the vehicle position information P, and the end of the link k, which represents the road along with the vehicle 50 is traveling, is acquired by the feature information acquiring unit 17 from the feature database DB2 (step #03). In addition, when feature information F has not been acquired in step #3 (step #04: No), the navigation apparatus 1 executes the feature information collecting processing (step #07). An example of this feature information collecting processing will be explained below in detail with reference to the flowchart that is shown FIG. 12.

Figure 14:
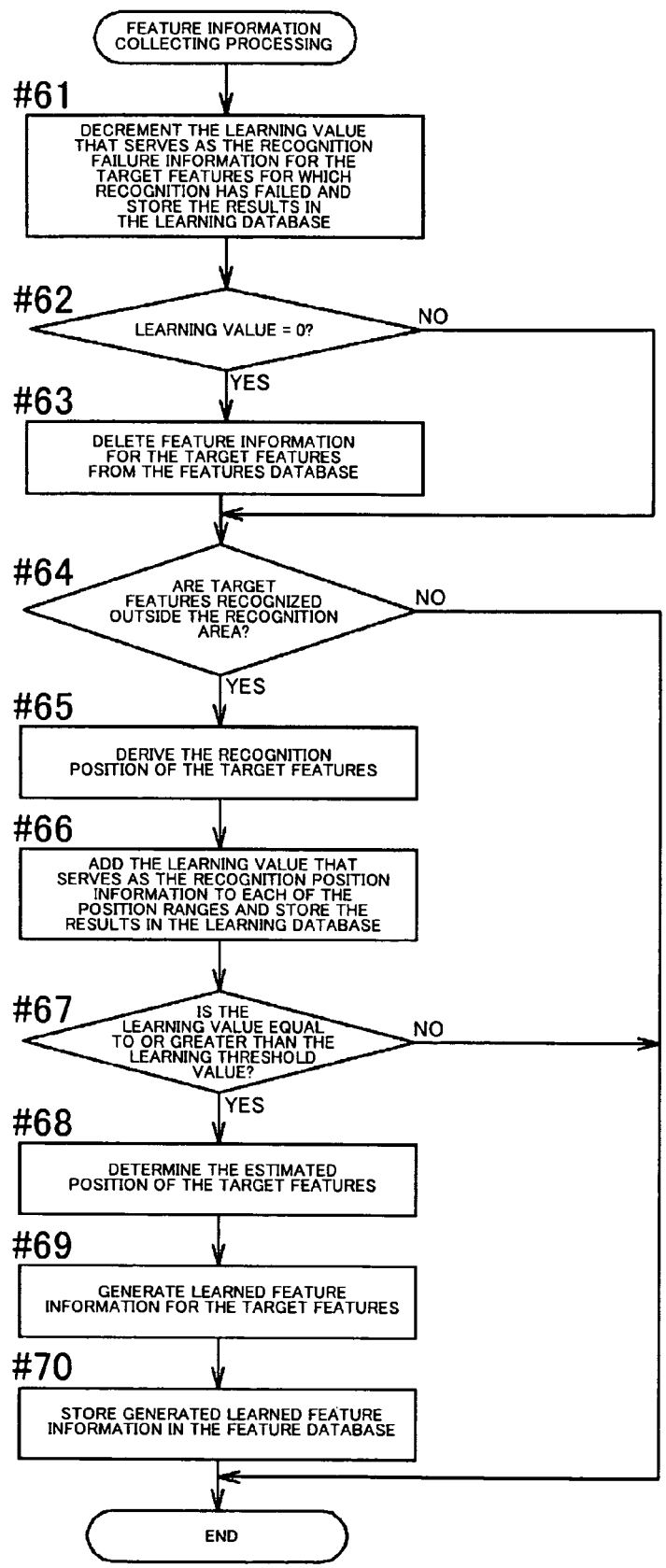
FIG. 14 is a flowchart that shows an exemplary feature information correcting method.

In contrast, when the feature information F has been acquired in step #03 (step #04: Yes), for each of the target features that is shown by each set of feature information F that has been acquired in step #03 by the image recognition unit 18, a recognition area E is set and image recognition processing is carried out (step #05). This image recognition processing in step #05 is position revising image recognition processing carried out by the image recognition unit 18, which has been described above. Then, when target features in the recognition area E have been recognized by image recognition by step #05 (step #6: Yes), the revision of the vehicle position information P is carried out by the vehicle position information revising unit 19 based on the image recognition results for the target features and the position information for the target features that is included in the feature information F for the target features (step #8). In contrast, when the target features in the recognition area E could not be recognized by image recognition (step #06: No), the navigation apparatus 1 executes the feature information correcting processing (step #09). An example of this feature information correcting processing will be explained below in detail with reference to the flowchart that is shown in FIG. 14. At this point, the method is ended.

An exemplary feature information collecting method will be explained with reference to FIG. 12. The exemplary method may be implemented, for example, by one or more components of the above-described apparatus 1. However, even though the exemplary structure of the above-described apparatus 1 may be referenced in the description, it should be appreciated that the structure is exemplary and the exemplary method need not be limited by any of the above-described exemplary structure.

Figure 12:
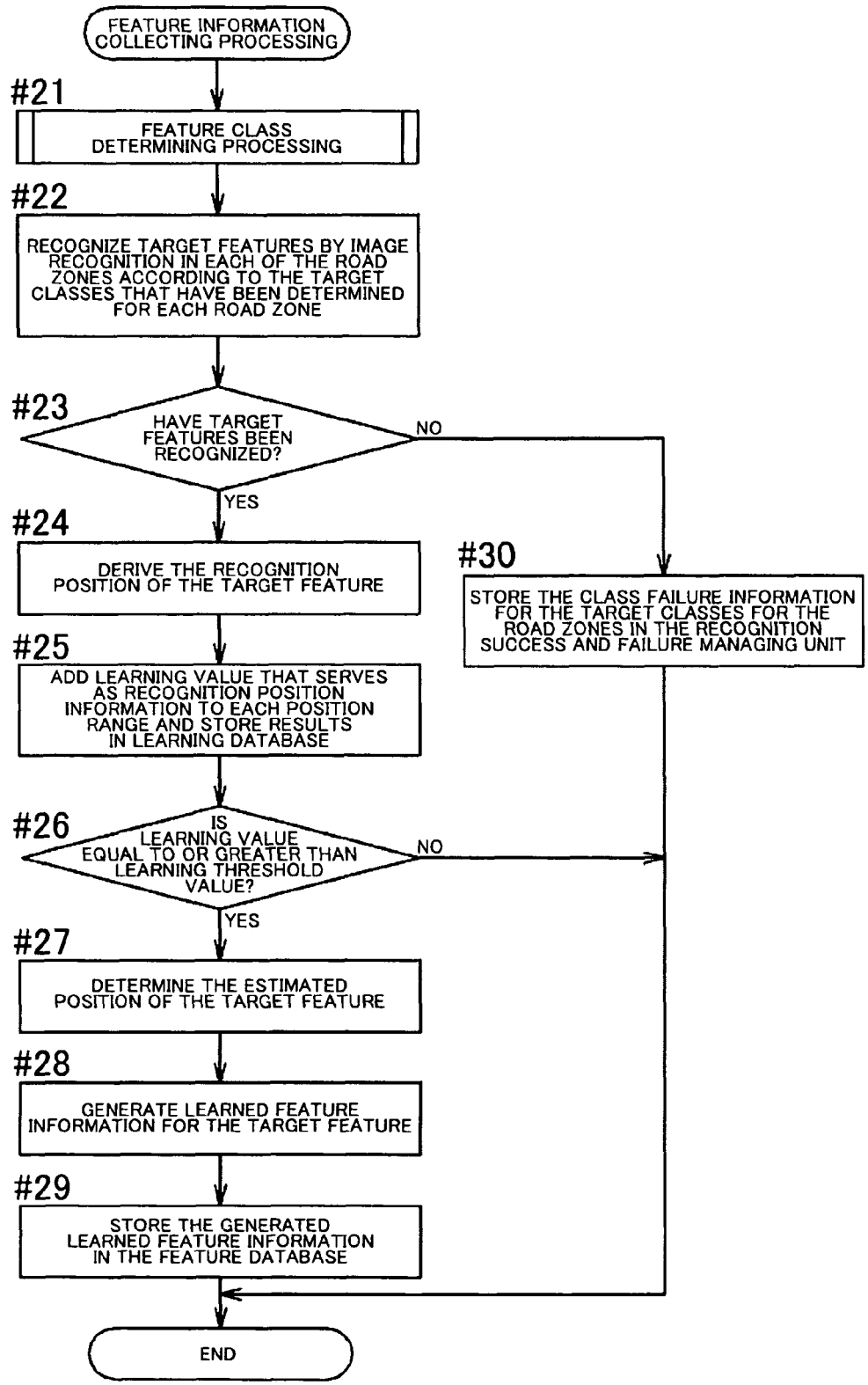
FIG. 12 is a flowchart that shows an exemplary feature information collecting method.

As shown in FIG. 12, first, the target class determining processing is carried out by the target class determining unit 42 (step #21). This target feature determining processing determines, as the target classes, the feature classes, which are used as the targets of the information collecting image recognition processing, from among the plurality of target classes that can become target features. At this time, the target classes are determined for each of the predetermined road zones Z (refer to FIGS. 9A-10B). An example of this target class determining process will be explained below in detail with reference to the flowchart that is shown in FIG. 13. Next, the image recognition processing for the target features in the road zones Z is carried out according to the target classes that have been determined for each road zones Z in step #21 by the image recognition unit 18 (step #22). At this time, the image recognition unit 18 carries out image recognition in which the features of the target classes that have been determined for each of the road zones Z are used as the target features. This image recognition processing in step #22 is information collecting image recognition processing carried out by the image recognition unit 18 that has been described above. In addition, in one road zone Z, when the target features could not be recognized by image recognition (step #23: No), in this road zone Z, the class failure information S4 (refer to FIG. 1), which represents that the image recognition of the target classes that has been determined in step #21 has failed, is stored in the recognition success and failure managing unit 45 (step #30).

In contrast, when the target features have been recognized by image recognition by the image recognition unit 18 (step #23: Yes), the recognition positions of the target features are derived by the recognition position deriving unit 32 based on the vehicle position information P that has been acquired in step #01 (step #24). Next, the recognition position information Aa, which represents the recognition position of the target features that was derived in step #24, is generated as a learning value for the predetermined position range to which the recognition position belongs, and as shown in FIG. 5B and FIG. 7, the learning value is added to each of the position ranges and the results are stored in the learning database DB3 (step #°). Here, when the learning value, which is used as the recognition position information Aa for the target features that have been stored in the learning database DB3, is less than a predetermined learning threshold value T1 (step #26: No), the method immediately ends.

In contrast, when the learning value, which is used as the recognition position information As for the target features that have been stored in the learning database DB3, is equal to or greater than the predetermined learning threshold value T1 (step #26: Yes), the estimated positions pg of the target features are determined by the estimated position determining unit 34 (step #27). Subsequently, the learned feature information Fb for the target features is generated by the feature information generating unit 36, where the learned feature information Fb is associated with the estimated position pg that has been determined in step #27 and the feature attribute information that is based on the image recognition results (step #28). Then the generated learned feature information Fb is stored in the feature database DB2 (step #29). At this point, the feature information collecting method ends.

An exemplary target class determining method will be explained with reference to FIG. 13. The exemplary method may be implemented, for example, by one or more components of the above-described apparatus 1. However, even though the exemplary structure of the above-described apparatus 1 may be referenced in the description, it should be appreciated that the structure is exemplary and the exemplary method need not be limited by any of the above-described exemplary structure.

Figure 13:
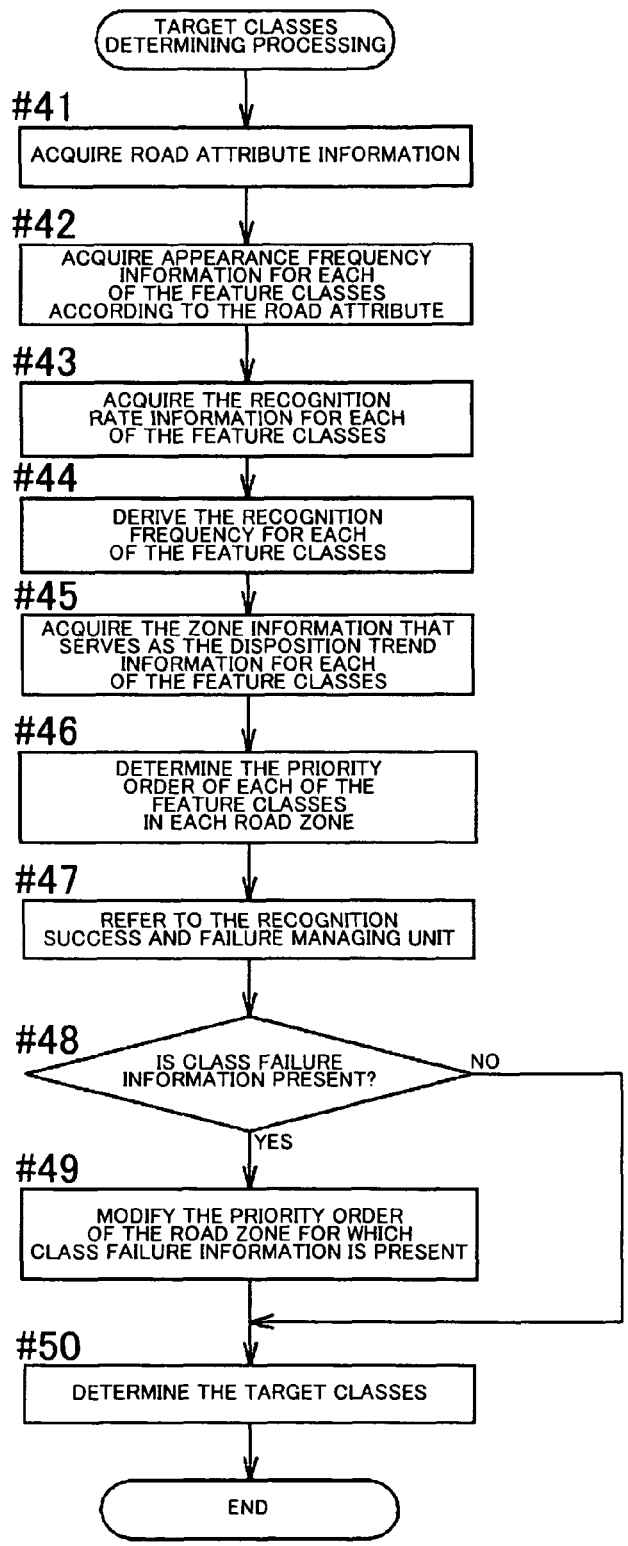
FIG. 13 is a flowchart that shows an exemplary target class determining method.

As shown in FIG. 13, first, the road attribute information Rb (refer to FIG. 1) for the road (link k) along which the vehicle 50 is traveling is acquired from the map database DB1 based on the vehicle position information P that has been acquired by the road attribute information acquiring unit 41 in step #01 (step #41). Next, the appearance frequency information S2 (refer to FIG. 1) of each of the target classes according to the road attribute information Rb that has been acquired in step #41 is acquired from the appearance frequency database DB5 (step #42) by the recognition frequency deriving unit 43 of the target class determining unit 42. In addition, the recognition rate information S1 for each of the target classes is acquired from the recognition attributes database DB4 by the recognition frequency deriving unit 43 (step #43). In addition, the recognition frequency of each of the target classes is derived based on the information that has been acquired by steps #41 to #43 by the recognition frequency deriving unit 43

(step #44). The deriving method of the recognition frequency for each of the target classes by this recognition frequency deriving unit 43 is the same as has been explained already.

Next, the segment information S3, which is used as the disposition trend information for each of the target classes, is acquired from the disposition trend database DB6 by the target class determining and calculating unit 44 of the target class determining unit 42 (step #45). In addition, the priority order of each of the feature classes is determined by the target class determining and calculating unit 44 for each of the predetermined road zones Z that are shown by the segment information S3 (step #46). Specifically, as explained above, in each of the prescribed road zones Z that are shown by the segment information S3, a priority order for each of the target classes is determined such that the target classes that have a high recognition frequency is raised. Subsequently, the target class determining unit 42 refers to the recognition success and failure managing unit 45 (step #47). In addition, it is determined whether the class failure information S4 for the road zones Z, whose priority order has been determined in step S#46, is stored in the recognition success and failure managing unit 45 (step #48). Here, when such class failure information S4 is not stored in the recognition success and failure managing unit 45 (step #48: No), the processing proceeds to step #50. In contrast, when the class failure information S4 for the road zones Z, for which the priority order has been determined in step #46, is stored in the recognition success and failure managing unit 45 (step #48: Yes), the priority order of the road zones Z for which there is class failure information S4 is modified. Specifically, as explained above, the priority order is modified such that the order of the feature classes that are shown in the class failure information S4 is lowered. Then, one or more target classes are determined according to the priority order for each of the feature classes that have been determined in steps #46 and #49 by the target class determining and calculating unit 44 (step #50). At this point, the target class determining method ends.

Next, an exemplary feature information correcting method according to the present example will be explained with reference to FIG. 14. The exemplary method may be implemented, for example, by one or more components of the above-described apparatus 1. However, even though the exemplary structure of the above-described apparatus 1 may be referenced in the description, it should be appreciated that the structure is exemplary and the exemplary method need not be limited by any of the above-described exemplary structure.

As shown in FIG. 14, first, in the position revising image recognition processing in step #05, the learning values that serve as the recognition failure information Ac for the target features are generated by the recognition failure processing unit 33 for the target features for which the image recognition in the recognition area E has failed (step #06: No), and as shown in FIG. 6B and FIG. 8, the learning values for the target features are decremented, and the result is stored in the learning database DB3 (step #61). Here, when the learning value is not zero (step #62: No), the processing proceeds to step #64. In addition, when the learning value is zero (step #62: Yes), that is, when the learning value has become less than the deletion threshold value T2, the feature information F of the target feature is deleted from the feature database DB2 (step #63) by the deletion managing unit 38.

Subsequently, in the position revising image recognition processing in step #05, it is determined whether the target features outside of the recognition area E have been recognized by image recognition by the recognition failure processing unit 33 (step #64). When the target features outside of the recognition area E have not been recognized by image recognition (step #64: No), the processing immediately ends. In contrast, when the target features outside of the recognition area E have been recognized by image recognition (step #64: Yes), processing that is similar to the processing in steps #24 to #29, for the case in which the target features have been recognized by image recognition in information collecting image recognition processing, is carried out by the recognition position deriving unit 32. Specifically, the recognition position of the target features is derived based on the vehicle position information P that was acquired in step #01 by the recognition position deriving unit 32 (step #65). Next, as shown in the example of the pedestrian crossing f5 in FIG. 6B, the recognition position information Aa, which represents the recognition positions of the target features that have been derived in step #65, is generated as a learning value for the prescribed ranges to which the recognition position belong, the learning value is added to each of the position ranges, and the results are stored in the learning database DB3 (step #66). Here, when the learning values that serve as the recognition position information Aa for the target features that have been stored in the learning database DB3 are less than the predetermined learning threshold value T1 (step #67: No), the processing immediately ends.

In contrast, when the learning values that serve as the recognition position information Aa for the target features that have been stored in the learning database DB3 are equal to or greater than the predetermined learning threshold value T1 (step #67: Yes), the estimated positions pg of the target features are determined by the estimated position determining unit 34 (step #68). Subsequently, the learned feature information Fb, which is associated with the estimated position pg that has been determined in step #68 for the target features and the feature attribute information that is based on the image recognition results, is generated (step #69) by the feature information generating unit 36. Next, the generated learned feature information Fb is stored in the learning database DB2 (step #70). At this point, the feature information correcting method ends.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, in the example described above, the recognition position deriving unit 32 derives the recognition position of the target features that are shown by the recognition position information Aa as information that represents the position of the target features on the road based on the vehicle position information P. However, the recognition position information Aa according need not be limited to such information for the position. Therefore, for example, using the recognition position of the target features that is shown by the recognition position information Aa for the position of the vehicle 50 that is represented by the vehicle position information P that was available during the acquisition of the image information G that includes the image of the target features is also possible. In this case, it is may be advantageous have the recognition position deriving unit 32 calculate the position on the road of the target features in the image information G for the position of the vehicle 50 based on the installation position, the installation angle, the angle of view and the like of the imaging device 11 when the learned feature information Fb is generated by the feature information generating unit 36, and use the position of the target features on the road as the position information that is included in the learned feature information Fb of the target features.

In the example described above, the estimated position determining unit 34 determines the modal value of the distribution to be the estimated position pg of the target features based on the distribution of a plurality of sets of recognition position information Aa for the same target feature. However, the determination method of the estimated position pg by the estimated position determining unit 34 need not be limited thereto. Another representative value such as the average value or the mean value of the distribution is may be used as the estimated position pg of the target features based on the distribution of the recognition position information Aa.

In the example described above, the recognition position deriving unit 32 adds a learning value of one point each time the image recognition of one target feature is successful. However, in the image recognition processing of the target features by the image recognition unit 18, the recognition confidence, which represents the certainty of being the target features of the target class that has been determined by the target class determining unit 42 based on the image recognition results, may be determined, and learning values that differ depending on the recognition confidence may be added. Specifically, when the learning value that serves as the recognition position information Aa is added to each of the position ranges and the results are stored in the learning database DB3, and the confidence that the target features are the target features of the feature class is high, a large value is added as the learning value. Conversely, when the confidence is low, a small value is added as the learning value. In addition, the learning value that is added each time that the image recognition of the target features is successful is not limited to positive numbers, and using negative numbers is also possible. In addition, this learning value is not limited to integers, and using decimal numbers is also possible.

In the example described above, the recognition failure processing unit 33 decrements the learning value for the target features used as the recognition failure information Ac with respect to the predetermined initial value Td each time that the image recognition of the features fails, and the feature information F of the target features is deleted from the feature database DB2 when the learning value becomes zero. However, the structure of the learning value that serves as the recognition failure information Ac need not be limited thereto. For example, the initial value Td of the learning value may be set to zero, the learning value may decremented each time the image recognition fails, and the feature information F of the target feature may be deleted from the feature database DB2 when the learning value becomes equal to or less than a predetermined deletion threshold value T2 that has been set to a negative value. In addition, the learning value that is decremented each time the image recognition of the target features fails is not limited to a positive value, but using a negative value is also possible. In addition, this learning value is not limited to an integer, but using a decimal number or a fractional number is also possible. Furthermore, the structure of the recognition failure information Ac that is stored in the learning database DB3 need not be limited to the structure using such a learning value. It is possible to use information having various configurations that are suitable for storing the fact that the image recognition of the target features that are shown by the feature information F has failed.

The manner in which each of the databases DB1 to DB6 in the example described above are divided is simply an example, and the hardware structure of each of the databases DB1 to DB6 is not limited thereto. Therefore, for example, it is possible to freely select a structure in which, for example, the feature database DB2 and the learning database DB3 are unified into one database or the map database DB1 and the feature database DB2 are unified into one database.

In the example described above, the range of the vicinity of the vehicle 50 for determining whether target features that have been stored as the feature information F are present in the vicinity of the vehicle 50 is set to a range from the current position (vehicle position) of the vehicle 50 that is shown by the vehicle position information P to the end of the link k that represents the road along which the vehicle 50 is traveling. However, this is simply an example, and it is possible to use a range that is determined by other criteria as the range of the vicinity of the vehicle 50. Therefore, for example, setting the range of the vicinity of the vehicle 50 to a range within a predetermined distance from the current position of the vehicle 50 that does not use the link k as the unit is also possible.

In the example described above, a feature information collecting apparatus 2 is explained that has a structure in which it is possible to carry out both of two processes: the feature information collecting process that, when target features that have been stored as feature information are not present in the vicinity of the vehicle 50, the position of the target features based on the image recognition results in which the features of predetermined target classes are used as the target features are learned and the feature information F is generated; and feature information collecting processing that, when the target features that have been stored as feature information F are present in the vicinity of the vehicle 50, the image recognition of the target features that are shown by the feature information F has failed and the feature information F is deleted or corrected. However, the example of the feature information collecting apparatus 2 according to the present invention need not be limited thereto, and for example, using a structure in which it is possible to carry out one of either the feature information collecting processing or the feature information correcting processing and the deletion processing of the feature information is also possible.

In the example described above, the appearance frequency information S2 and the recognition rate information S1 are acquired by the recognition frequency deriving unit 43 of the recognition frequency determining unit 42, and the appearance frequency for each of the feature classes depending on the road attributes that are shown by the appearance information S2 and the expected value of the recognition rate of the features of each of the feature classes that are shown by the recognition rate information S1 are multiplied to find the recognition frequency. However, for example, using a structure in which, for combinations of all road attributes and feature classes, a recognition frequency table that specifies the recognition frequencies is used, and based on the road attribute information Rb that has been obtained by the road attribute information acquiring unit 41, the recognition frequency of each of the feature classes is found by referring to the recognition frequency table, is also possible.

In the example described above, when the target classes are determined for each of the road zones Z based on the priority order of each of the feature classes of each of the road zones Z, the feature classes for which the priority order of each of the road zones Z is "1" are determined to be the target features. This is because it is effective to limit the number of target classes to a small number in order to minimize the burden of the image recognition processing by the image recognition unit 18. Note that when there is excess and ample calculation processing capacity by the image recognition unit 18, it is possible to use target classes other than the feature classes for which the priority order for each of the road zones Z is "1," and the number of the target classes can be increased. In addition, in this case, it is possible to use different feature classes of the road zone Z as the target classes.

In the example described above, the road class information and the region class information are acquired as road attribute information Rb, and based on these sets of information, the appearance frequency of each of the feature classes in the road along which the vehicle 50 is traveling is found. However, it is possible to use a structure in which road attributes other than the road class and the region class are acquired as road attribute information Rb providing that they influence the appearance frequency of the feature class. Therefore, for example, using a structure in which information such as the link length, the road width, the link shape and the like are acquired as road attribute information Rb is also possible.

In the example described above, in order to determine the target classes, the recognition rate information S1 that represents the predictive value of the recognition rate of the features in each of the feature classes is acquired as recognition attribute information for each of the feature classes. However, it is possible to use various types of information that influence the image recognition processing of the features of each of the feature classes as recognition attribute information to be used in the determination of the target classes.

In the example described above, during the determination of the target classes, the segment information S3 for each of the feature classes that have been stored in the disposition trend database DB6 is referred to, the feature classes for each road zone Z that is shown by each set of the segment information S3 are partitioned, and the priority order of each of the feature classes is determined in a sequence starting from the feature classes that have the highest recognition frequency. However, using a structure in which the determination of the target classes is carried out without using the disposition trend information for the features of each of the feature classes such as this segment information S3 is also possible. In this case, for example, it is possible to use a structure in which, depending on the recognition frequencies of each of the feature classes that have been derived by the recognition frequency deriving unit 43, one or more of the feature classes for which the recognition frequency is highest among all of the feature classes that can become target classes and are determined to be the target classes.

In the example described above, during the determination of the target classes, the class failure information S4 that is stored in the recognition success and failure managing unit 45 is referred to, and the target classes are determined based on the information for the success or failure of the image recognition of the target features in the past. However, using a structure in which the recognition success and failure managing unit 45 is not provided, and using a structure in which the priority order of each of the feature classes are determined uniformly based on, for example, the recognition frequency of each of the feature classes that have been derived by the recognition frequency deriving unit 43 irrespective of the success or failure of the image recognition of the target features in the past, and then the target classes are determined is also possible.

In the example described above, the features of the feature classes that have been selected from among the various types of road markings that are provided on the surface of the road are used as the target features. However, it is possible to use various features that are provided in the vicinity of the road as the target features. Therefore, it is possible to use a variety of features, for example, the road signs, guidance signs, sign boards, traffic signals, and manholes and the like as the target features.

Figure 15:
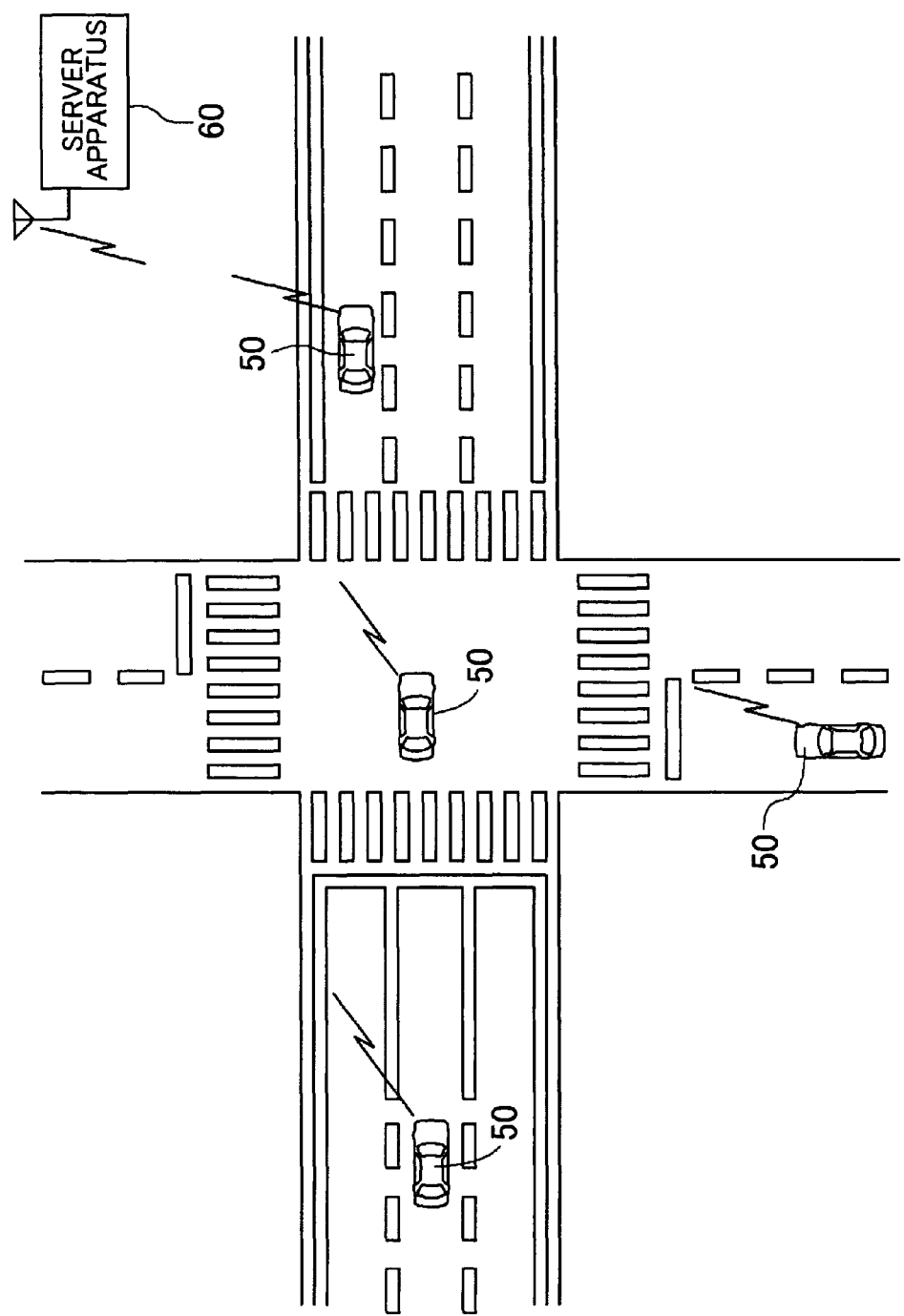
FIG. 15 is a drawing that shows an example of a feature information collecting apparatus including a server.

In the example described above, the entire structure of the feature information collecting apparatus 2 according to the present invention is mounted on the vehicle 50. However, as shown in FIG. 15, using a structure in which a portion of the structure of the feature information collecting apparatus 2 that includes the learning database DB3, which serves as the recognition result storing device of the present invention, is disposed in a server apparatus 60 that is able to communicate with a plurality of vehicles 50 via a wireless communication circuit or the like, is possible. If the feature information collecting apparatus 2 is structured in this manner, it is possible to accumulate learned results for target features obtained by a plurality of vehicles 50 in the learning database DB3 that is disposed in the server apparatus 60. Therefore, it is possible to use more recognition position information Aa and recognition failure information Ac and to generate feature information F of the target features that have more precise and accurate position information.

Note that the structure of the feature information collecting apparatus 2 that is disposed in the server apparatus 60 need not be limited to the learning database DB3, and it is possible to dispose the entire structure, excepting the structures that must be mounted on the vehicle 50 such as the imaging device 11 and the vehicle position information collecting unit 16 and the like, in the server apparatus 60. In addition, similarly, disposing a portion of the structures of the image recognition apparatus 3, the vehicle position recognition apparatus 4, and the navigation apparatus 1 in the server apparatus 60 is possible.

In each of the examples described above, the image recognition apparatus 3 according to the present invention is used in the feature information collecting unit 2, and the feature information collecting apparatus 2 according to the present invention is used in the vehicle position recognition apparatus 4 and the navigation apparatus 1. However, it is possible to use each apparatus in an alternative use that differs from those of the example described above, such that, for example, the vehicle position recognition apparatus 4, which includes the image recognition apparatus 3 and the feature information collecting apparatus 2 according to the present invention are used in a travel control apparatus for a vehicle.

What is claimed is:

1. A feature information collecting apparatus, comprising:
   a memory that stores road information that represents a road network by connection relationships between nodes that correspond to intersections and links that correspond to roads linking the intersections; and
   a controller that:
   acquires vehicle position information that represents a current position of a vehicle;
   acquires image information of a vicinity of the vehicle;
   carries out image recognition processing of a target feature that is included in the image information to determine a recognition position of the target feature;
   stores recognition position information in the memory that is based on the acquired vehicle position information and that represents the determined recognition position of the target feature;
   determines an estimated position of the target feature based on set of a plurality of stored recognition position information for the target feature, the plurality of stored recognition position information for the target feature being stored due to the target feature being subject to image recognition processing a plurality of times; and corrects a position of a stored node based on the estimated position of the target feature and an estimated position of another target feature, the target feature and the other target feature surrounding the node and being disposed at substantially equal distances from the stored node.

2. The feature information collecting apparatus according to claim 1, wherein the controller:
determines a representative value of a distribution of the plurality of stored position information for the target feature to be the estimated position.

3. The feature information collecting apparatus according to claim 1, wherein the controller:
uses the plurality of stored recognition position information for the target feature as learning values for a predetermined position range, the predetermined position range including the determined recognition positions of the plurality of stored recognition position information for the target feature;
adds the learning values to each of the position range each time the target feature is recognized and stores the results; and
determines a position that represents the position ranges for which the learning value for the target feature has become equal to or greater than a predetermined learning threshold value to be the estimated position of the target feature.

4. The feature information collecting apparatus according to claim 1, wherein the controller:
determines a feature distance, which represents the distance between two target features, based on sets of the recognition position information for the two target features.

5. The feature information collecting apparatus according to claim 1, wherein the controller:
generates feature information that associates the estimated position of the target feature and the attribute information, the attribute information based on the recognition position off the target feature.

6. The feature information collecting apparatus according to claim 1, wherein:
the memory stores feature information including at least one of:
learned feature information that associates the estimated position of the target feature and the attribute information, the attribute information based on the recognition position of the target feature; and
initial feature information that includes position information and attribute information that have been prepared in advance for a plurality of target features.

7. The feature information collecting apparatus according to claim 6, wherein:
the controller:
carries out image recognition processing on the image information to identify target features that that have been extracted from the feature information based on the vehicle position information;
stores recognition failure information, which represents that the image recognition of the target features that are shown by the feature information by the image recognition device has failed, such that the target features can be distinguished; and
deletes feature information for a target feature in the feature information based on a set of recognition failure information for the target feature, the set of recognition failure information stored due to the image recognition processing having been carried out a plurality of times on the same target feature.

8. The feature information collecting apparatus according to claim 7, wherein the controller:
uses the recognition failure information for each of the target features as a learning value for the target features;
decrements a learning value each time the image recognition of a corresponding target features fails; and
deletes the feature information for a target feature when the corresponding learning value becomes equal to or less than a predetermined threshold value.

9. The feature information collecting apparatus according to claim 1, wherein the controller:
is configured to communicate with a plurality of vehicles; and
stores the recognition position information obtained by the plurality of vehicles.

10. A vehicle position recognition apparatus, comprising:
the feature information collecting apparatus according to claim 5;
wherein the controller revises the vehicle position information based on the image recognition results for the target features and the feature information for the target features.

11. A navigation apparatus, comprising:
the vehicle position recognition apparatus according to claim 10; and
a memory that stores map information;
wherein the controller outputs guidance information based on the map information.

12. A feature information collecting method, comprising:
accessing a memory that stores road information that represents a road network by connection relationships between nodes that correspond to intersections and links that correspond to roads linking the intersections;
acquiring vehicle position information that represents a current position of a vehicle;
acquiring image information of a vicinity of the vehicle;
carrying out image recognition processing of a target feature that is included in the image information to determine a recognition position of the target feature;
storing recognition position information in the memory that is based on the acquired vehicle position information and that represents the determined recognition position of the target feature;
determining an estimated position of the target feature based on a set of a plurality of stored recognition position information for the target feature, the plurality of stored recognition position information for the target feature being stored due to the target feature being subject to image recognition processing a plurality of times; and
correcting a position of a stored node based on the estimated position of the target feature and an estimated position of another target feature, the target feature and the other target feature surrounding the node and being disposed at substantially equal distances from the stored node.

13. The feature information collecting method according to claim 12, further comprising:
using the plurality of stored recognition position information for the target feature as learning values for a predetermined position range, the predetermined position range including the determined recognition positions of the plurality of stored recognition position information for the target feature;

adding the learning values to each of the position range each time the target feature is recognized and stores the results; and determining a position that represents the position ranges for which the learning value for the target feature has become equal to or greater than a predetermined learning threshold value to be the estimated position of the target feature.

14. The feature information collecting method according to claim 12, further comprising:

carrying out image recognition processing on the image information to identify target features that that have been extracted from the feature information based on the vehicle position information;

storing recognition failure information, which represents that the image recognition of the target features that are shown by the feature information by the image recognition device has failed, such that the target features can be distinguished; and deleting feature information for a target feature in the feature information based on a set of recognition failure information for the target feature, the set of recognition failure information stored due to the image recognition processing having been carried out a plurality of times on the same target feature.

15. The feature information collecting method according to claim 14, further comprising:

using the recognition failure information for each of the target features as a learning value for the target features;

decrementing a learning value each time the image recognition of a corresponding target features fails; and deleting the feature information for a target feature when the corresponding learning value becomes equal to or less than a predetermined threshold value.

* * * * *